United States Patent [19]
Iwaya et al.

[11] Patent Number: 5,544,002
[45] Date of Patent: Aug. 6, 1996

[54] HIGH VOLTAGE CAPACITOR AND MAGNETRON

[75] Inventors: Shouichi Iwaya; Masahiro Yahagi; Hitoshi Kudou; Shigeru Itou; Isao Fujiwara; Tadashi Ogasawara; Makoto Morita; Teruo Taguchi; Setuo Sasaki, all of Tokyo, Japan

[73] Assignee: TDK Corporation, Tokyo, Japan

[21] Appl. No.: 196,229

[22] PCT Filed: Aug. 26, 1992

[86] PCT No.: PCT/JP92/01077

§ 371 Date: Feb. 24, 1994

§ 102(e) Date: Feb. 24, 1994

[87] PCT Pub. No.: WO93/04494

PCT Pub. Date: Mar. 4, 1993

[30] Foreign Application Priority Data

Aug. 27, 1991 [JP] Japan ................... 3-075727
Aug. 29, 1991 [JP] Japan ................... 3-077156
Sep. 5, 1991 [JP] Japan ................... 3-080035
Sep. 12, 1991 [JP] Japan ................... 3-82301
Sep. 24, 1991 [JP] Japan ................... 3-85423
Oct. 8, 1991 [JP] Japan ................... 3-90580

[51] Int. Cl.$^6$ .......................... H01G 4/35; H01G 4/38
[52] U.S. Cl. ................................ 361/302; 361/330
[58] Field of Search ........................ 361/302, 307, 361/328–330, 517–520, 535–541; 174/52.2, 52.4

[56] References Cited

U.S. PATENT DOCUMENTS

| | | |
|---|---|---|
| 4,370,698 | 1/1983 | Sasaki . |
| 4,811,161 | 3/1989 | Sasaki et al. . |
| 5,032,949 | 7/1991 | Sasaki et al. . |
| 5,113,309 | 5/1992 | Sasaki et al. . |

*Primary Examiner*—Bot L. Ledynh
*Attorney, Agent, or Firm*—Oblon, Spivak, McClelland, Maier & Neustadt, P.C.

[57] ABSTRACT

A high voltage capacitor is disclosed that comprises a grounding member (1), two through type capacitors (2 and 3), an insulating case (6) and insulating resin (71 and 72). The grounding member (1) has two raised portions (101 and 102) on which the through type capacitors (2 and 3) are secured. The insulating case (6) has two hollow cylindrical portions (61, 62) spaced apart by a distance D with their upper open ends joined to each other to form a recessed enclosure (63) in line with and following the inner diameter sections (611, 621) of the hollow cylindrical portions (61, 82) and their lower open ends fitted on the outer circumference of the raised portions (101, 102). The insulating resin (71 and 72) is provided around the through type capacitors (2 and 3) within the inner diameter sections (611, 621). It is thus possible to provide a high voltage capacitor with superior mechanical strength and excellent withstand voltage characteristics even in humid environments and that is small in size and inexpensive.

7 Claims, 23 Drawing Sheets

| TEST CONDITION | 120°C −DC15kV |
|---|---|
| PRIOR ART PRODUCT | 3,6,16,22 AND 500 HOURS |
| PRODUCT ACCORDING TO THE INVENTION | 2000 HOURS OR MORE |

|  | FAILURE TIME |
|---|---|
| PRIOR ART PRODUCT | 1500 HOURS AND 2000 HOURS NO FAILURE (n=3) IN 2000 HOURS |
| PRODUCT ACCORDING TO THE INVENTION | NO FAILURE (n=5) IN 5000 HOURS |

HIGH VOLTAGE CAPACITOR AND MAGNETRON

TECHNICAL FIELD

The present invention relates to a high voltage capacitor and a magnetron using this high voltage capacitor as a filter.

BACKGROUND ART

The best known high voltage capacitor of this type to date is a two-ganged type high voltage capacitor as disclosed in, for instance, Japanese Utility Model Examined Publication No. 19388/1989 or 48112/1985. This high voltage capacitor comprises a through type capacitor having two spaced-apart through holes, independent electrodes formed on one of opposite surfaces, where the through holes open, and a common electrode provided on the other surface shared by the independent electrodes, the common electrode being bonded by means of soldering or the like to a raised portion of a grounding member. Conductors clad with insulating tubes pass through the respective through holes of the through type capacitor and a through hole of the grounding member, and they are soldered by electrode connectors to the independent electrodes of the through type capacitor. The grounding member has a central raised portion formed on one side. An insulating case is fitted on the outer circumference of the raised portion of the grounding member on one side thereof so as to surround the through type capacitor, and an insulating cover is fitted on the other side so as to surround the conductors. The insulating case is usually made of a thermoplastic resin such as polybuthylene telephthalate (PBT) to achieve cost reduction. A thermosetting insulating resin such as an epoxy resin is provided on the inner and outer sides of the through type capacitor, which is surrounded by the insulating case and cover, thus ensuring moisture resistance and electric insulation. The conductors have terminal sections, such as tab connectors formed on the side of the insulating case for connection to the outside.

Since this high voltage capacitor comprises a thermosetting resin such as an epoxy resin provided on the inner side of the through type capacitor, it is necessary to reduce thermal stress generated in withstand voltage tests or heat shock tests or in use or shrinkage stress generated at the time of hardening. Heretofore, this has been achieved by covering the conductors with insulating tubes of silicone rubber or the like. The silicone rubber insulating resin tubes are elastic and can thus prevent interface separation between a porcelain element constituting the through type capacitor and the epoxy resin.

However, since the prior art high voltage capacitor comprises a through type capacitor with insulating resin provided on the inner and outer sides of the capacitor, the contact interface between the through type capacitor and the insulating resin extends broadly along the inner and outer peripheries of the through type capacitor. Therefore, the likelihood of interface separation occurring is high, and voltage breakdown failure is liable to occur. In addition, since the capacitor uses a two-ganged through type capacitor with an insulating resin provided therearound, size reduction is limited. Furthermore, the use of the two-ganged through type capacitor leads to high cost. The above problems are also present in a magnetron which uses the before-mentioned high voltage capacitor. In order to solve the problems described above, independent capacitor type high voltage capacitors using two independent through type capacitors, which had been commonly used before the two-ganged type, were reconsidered. However, the independent capacitor type high voltage capacitor comprises independent through type capacitors, which results in insufficient mechanical strength when they are bonded to a grounding member. Furthermore, conductors are mounted in the respective through type capacitors, and external connectors are fitted on and removed from tab-type terminal sections of the conductors. Therefore, insufficient mechanical strength leads to looseness in the conductors to cause interface separation of the conductors, the dielectric body and the grounding member from the insulating resin. In such a case, the withstand voltage characteristic is greatly deteriorated.

Furthermore, even with a structure in which an insulating case is provided for each through type capacitor with an insulating resin provided around the through type capacitor in the insulating case, it is difficult to ensure sufficient mechanical strength to withstand external forces exerted when connecting the external connectors. Besides, the insulating resin has to be provided independently for each insulating case, thus leading to an increase in the number of insulating resin pouring steps and increasing the cost. Furthermore, when water drops or the like collect on the surface of the insulating case, creeping discharge may be produced along the insulating case surface to result in withstand voltage failures.

Study was further conducted of a structure in which two through type capacitors are covered by a single insulating case and an insulating resin is provided to fill the inner space of the case. In this case, excess insulating resin is provided, thus increasing thermal stress generated in heat cycle tests to increase the likelihood of withstand voltage failure or the like. Besides, the overall size and cost are increased.

Another aspect of this type of high voltage capacitor is that it has an important application as a filter of a magnetron in a microwave oven and is, therefore, frequently used in environments of high relative humidity or with much dust. Therefore, it is required to a high degree of withstand voltage under humid conditions. The prior art high voltage capacitor, however, has an insulating case comprising a thermoplastic resin such as PBT, which is fitted on the outer circumference of a raised portion of the grounding member. This means that most of the path extending from the conductors to the grounding member is constituted of the surface of the insulating case made of a thermoplastic insulating resin. Thermoplastic resin such as PBT is inferior in tracking resistance characteristics to thermosetting resins such as an epoxy resin or an unsaturated polyester resin. Therefore, it has been difficult to obtain a high voltage capacitor having satisfactory tracking resistance characteristics. The tracking resistance characteristics may be improved by using a thermosetting resin such as an epoxy resin or an unsaturated polyester resin for the insulating case. In this case, however, the cost is increased.

As a further problem with a prior art structure, in which an epoxy type thermosetting insulating resin is provided on the inner and outer sides of a through type capacitor to ensure moisture resistance and electric insulation, the bonding strength and adhesion between the dielectric porcelain element of the capacitor and the thermosetting insulating resin are insufficient. Therefore, in high temperature loading tests or moisture resistance loading tests, separation or cracks may occur in the contact interface between the dielectric porcelain element and the insulating resin, thus leading to electric breakdown.

As a still further problem, a gap or crack may be generated due to separation in the contact interface between the through type capacitor and a thermosetting resin such as an epoxy resin by thermal stress generated in withstand voltage tests, heat shock tests, in use or stress generated due to shrinkage at the time of hardening. In consequence, the withstand voltage characteristics deteriorate. The thermal stress or hardening shrinkage stress in a thermosetting insulating resin such as an epoxy resin may be reduced by covering a portion of the conductor that extends in the through hole capacitor with an insulating tube of silicone rubber or the like. In this case, however, since it is necessary to cover the conductor with an insulating tube of silicone rubber or the like, the number of components is increased, thus increasing the number of assembling steps because it is necessary to fit the insulating tube.

A yet further problem is posed by the use for the insulating case and insulating cover of an epoxy or like synthetic resin which has adhesion to the insulating resin. In this case, the adhesion of the insulating case and insulating cover to the insulating resin is greater than the adhesion of the through type capacitor to the insulating resin. Therefore, thermal stress generated due to temperature variations in heat shock tests, heat cycle tests or in use causes repeated shrinkage and expansion of the insulating resin originating at the insulating case and insulating cover. Consequently, separation, gaps or cracks may occur in the contact interface between the dielectric porcelain element and the insulating resin, causing electric field concentration in the separated part of the resin, gap or crack formed therein, thus resulting in creeping discharge breakdown or the like.

A further problem is posed by the use of the insulating case and insulating cover as molds for charging the insulating resin by having the case and cover fitted at one end thereof on or in the grounding member. In this step, if the contact of fit of the insulating case and insulating cover to the grounding member is insufficient, the charged insulating resin may flow out through the insufficient contact portions to the outside, thus resulting in defective products.

To prevent production of defective products due to the flow-out of the insulating resin, it is necessary to fit the insulating case and insulating cover to the grounding member in perfect contact therewith. However, failure of fitting or defective fitting of the insulating case and insulating cover to the grounding member is liable to result in the production of defective products. Besides, since the insulating case and insulating cover are necessary, the number of components and number of assembling steps are increased, thereby increasing costs.

In this type of high voltage capacitor it is very important to increase the bonding strength between the dielectric porcelain element of the through type capacitor and the insulating resin provided therearound, in order to ensure reliability. With the prior art high voltage capacitor, however, the bonding strength is about 20 to 40 kgf/cm$^2$ in a measurement temperature range of 80° to 140° C. Therefore, it has been impossible to prevent separation, gaps or cracks from occurring in the contact interface between the dielectric porcelain element and the insulating resin due to thermal stress generated due to temperature change in heat shock tests, heat cycle tests or in use. Therefore, there has been a problem that moisture intrudes into the separated portions, gaps or cracks in the contact interface between the dielectric porcelain element and the insulating resin in reliability tests such as high temperature loading tests, moisture resistance loading tests, in use under high temperature or high relative humidity conditions. In addition, electric field concentration in the separated areas, gaps or cracks is prone to cause voltage breakdown.

DISCLOSURE OF THE INVENTION

The first object of the invention is to provide a high voltage capacitor and a magnetron which have high mechanical strength and are superior in withstand voltage characteristics including those under humid conditions, as well as being small in size and inexpensive.

The second object of the invention is to provide a high voltage capacitor and a magnetron which are superior in tracking resistance characteristics and withstand voltage characteristics including those under humid conditions as well as being inexpensive.

The third object of the invention is to provide a high voltage capacitor and a magnetron, with higher bonding strength and adhesion between the dielectric porcelain element constituting a through type capacitor and an insulating resin to prevent separations or cracks from occurring in the contact interface between the dielectric porcelain element and the insulating resin and improve the reliability.

The fourth object of the invention is to provide a high voltage capacitor and a magnetron, in which the number of components and assembly steps may be reduced, and in which thermal stress generated in withstand voltage tests, heat shock tests or in use may be reliably reduced, and which are inexpensive.

The fifth object of the invention is to provide a high voltage capacitor and a magnetron in which the likelihood of separations, gaps or cracks occurring in the contact interface between the dielectric porcelain element and the insulating resin due to thermal stress is reduced, and are therefore more reliable, and which have a reduced number of components and assembly steps and being, therefore, inexpensive to produce.

To achieve the first object of the invention, a high voltage capacitor according to the first aspect of the invention comprises a grounding member, two through type capacitors, two conductors, an insulating case and an insulating resin. The grounding member has two raised portions formed on the same side, the raised portions each having a central hole and being spaced apart from each other. The two through type capacitors each have a through hole and two electrodes provided on their opposite surfaces, where the through hole opens, and are disposed on each raised portion so that one of the electrodes is bonded to the respective raised portion. The two conductors each pass through the through holes of the through type capacitors and each are connected independently to the electrodes on the other side. The insulating case has two hollow cylindrical projections spaced apart from each other, the hollow cylindrical projections having their upper open ends joined. The insulating case has a recessed enclosure in line with and following the inner diameter sections of the hollow cylindrical projections, the hollow cylindrical projections having lower open ends fitted on the outer circumference of the raised portions. The inner spaces of the insulating case each accommodate a through type capacitor. The insulating resin is provided around the through type capacitors.

To achieve the second object of the invention, a high voltage capacitor according to the second aspect of the invention comprises a grounding member, two through type capacitors, two conductors, an insulating case and an insulating resin. The grounding member has two raised portions formed on one side, the raised portions each having a hole. The through type capacitors each have a through hole and two electrodes on their opposite surfaces, where the through hole opens, and are disposed on each raised portion so that one of the electrodes is bonded to one of the raised portions.

The two conductors pass through the through holes of the through type capacitors, and are connected to the electrode on the other side. The insulating resin is constituted by an outer and inner insulating resin, the outer insulating resin being made of a thermosetting resin and provided around the through type capacitor on one side of the grounding member, the inner insulating resin being provided on the other side of the grounding member. The insulating case is made of a thermoplastic resin and fitted on the upper end of the outer insulating resin so that the outer insulating resin is exposed between the lower end of the insulating case and the grounding member.

To achieve the third object of the invention, a high voltage capacitor according to the third aspect of the invention comprises a grounding member, two through type capacitors, two conductors and an insulating resin. The grounding member has two raised portions formed on one side, the raised portions each having a hole. The through type capacitors are each composed of a dielectric porcelain element having a through hole and two electrodes on the opposite surfaces of the dielectric porcelain element where the through hole opens, and are disposed on each raised portion so that one of the electrodes is bonded to the raised portion. The conductors pass through the through holes of the through type capacitors, and are connected to the electrode on the other side. The insulating resin is an epoxy resin and is provided around the through type capacitors. The dielectric porcelain element of the through type capacitors is covered with an insulating film made of an epoxy or phenol type resin.

To achieve the fourth object of the invention, a high voltage capacitor according to the fourth aspect of the invention comprises a grounding member, two through type capacitors, two conductors and an insulating resin. The grounding member has two raised portions formed on one side, the raised portions each having a hole. The through type capacitors each have a through hole and two electrodes on their opposite surfaces where the through holes open, and are disposed on each raised portion so that one of the electrodes is bonded to each raised portion. The conductors pass through the through holes of the through type capacitors, and are connected to the electrode on the other side. The insulating resin is constituted by an outer and inner insulating resin, at least either the outer insulating resin or inner insulating resin being made of a urethane resin. The outer insulating resin is provided around the through type capacitors on one side of the grounding member, and the inner insulating resin is provided to fill the through holes of the through type capacitor on the other side of the grounding member.

To achieve the fifth object of the invention, a high voltage capacitor according to the fifth aspect of the invention comprises a grounding member, two through type capacitors, two conductors and an insulating resin. The grounding member has two raised portions on one side, the raised portions each having a hole. Each of the through type capacitors has a through hole and two electrodes provided on its opposite surfaces, where the through holes open, and each is disposed on each raised portion so that one of the electrodes is bonded to each raised portion. The conductors pass through the through holes and the holes in the raised portions, and each is connected to the electrode on the other side. The insulating resin constitutes an outer insulating resin and an inner insulating resin, the outer insulating resin being provided around the through type capacitors on one side of the grounding member with the entire outer circumference forming a space-partitioning contour, the inner insulating resin being provided to fill the through holes of the through type capacitors and with its entire outer circumference forming a space-partitioning contour.

As another means of achieving the fifth object, a high voltage capacitor according to the sixth aspect of the invention comprises a grounding member, two through type capacitors, two conductors and an insulating resin. The grounding member has two raised portions formed on one side, the raised portions each having a hole. Each of the through type capacitors has a dielectric porcelain element having a through hole and two electrodes formed on the opposite surfaces of the dielectric porcelain element, where the through holes open, and are disposed on each raised portion so that one of the electrodes is bonded to the raised portion. The two conductors pass through the through holes of the through type capacitors and the raised portions, and each is connected to the electrode on the other side. The insulating resin is provided around the through type capacitors in contact with the dielectric porcelain element. The dielectric porcelain element has a surface grain size of 2 to 5 μm and a surface roughness of 0.2 μm or more.

As yet another means of achieving the fifth object of the invention, a high voltage capacitor according to the seventh aspect of the invention comprises a grounding member, two through type capacitors, two conductors, insulating tubes thereon and an insulating resin. The grounding member has two raised portions formed on one side, each having a hole. The through hole capacitors each include a dielectric porcelain element having a through hole and two electrodes provided on the opposite surfaces of the dielectric porcelain element, where the through hole opens, and they are disposed on the raised portions so that one of the electrodes on each capacitor is bonded to one of the raised portions. The two conductors pass through the through holes of the through type capacitors and the raised portions, and each is connected to the electrode on the other side. The insulating tubes are made of an elastic resin and are fitted on the portions of the conductors passing through the through holes. The insulating resin constitutes an outer insulating resin and an inner insulating resin, at least either the outer insulating resin or the inner insulating resin being made of a urethane resin, the outer insulating resin being provided around the through hole capacitors on one side of the grounding member, the inner insulating resin being provided to fill the through holes of the through type capacitors on the other side of the grounding member.

In the second through seventh aspect of the invention, the high voltage capacitor may comprise one through type capacitor. In this case, the grounding member has a raised portion formed on one side, the raised portion having a hole. The through type capacitor has two through holes and two independent electrodes on one side and a common electrode on the other side, where the through holes open, and is disposed on the raised portion so that the common electrode is bonded to the raised portion. The two conductors pass through the through holes of the through type capacitor and the raised portion and each are connected to one of the two independent electrodes.

According to the first aspect of the invention, the grounding member has the two raised portions formed on the same side, the two through type capacitors each has a through hole and two electrodes provided on the opposite surfaces where the through hole opens, and are disposed on the raised portions so that one of the electrodes is bonded to the respective raised portions, and the conductors are provided for each of the capacitors so that they pass through the through holes, and are each independently connected to the electrode on the other side. This structure is thus a high voltage capacitor of independent capacitor type, and compared to the two-ganged high voltage capacitor structure, the likelihood of separation at the interface can be reduced. In addition, the likelihood of withstand voltage failure can be reduced. Furthermore, it is possible to reduce the size and cost. Moreover, since the insulating case has hollow cylindrical projections and the inner spaces of the insulating case each accommodates the through type capacitors, and the insulating resin is provided around the through type capacitors, it is possible to ensure moisture resistance and electric insulation as in the prior art owing to the insulating resin. The insulating resin is formed by pouring a minimum necessary quantity of resin and only into the hollow cylindrical projections. Besides, they are independent of each other in their respective hollow cylindrical projections. Thus, it is possible to reduce thermal stress generated when the capacitor is mounted in a microwave oven or in heat cycle tests, thus reducing withstand voltage failures or the like. Furthermore, since the two hollow cylindrical projections of the insulating case have their upper open ends joined and their lower open end portions fitted on the outer circumference of the raised portions of the grounding member, it is possible to obtain a structure, in which the insulating case is integrated at the top and bottom as a unit. This provides increased mechanical reinforcement of the capacitors and conductors which are housed in the inner spaces of the hollow cylindrical projections and thus reducing the likelihood of looseness of the conductors. It is thus possible to reduce the likelihood of interface separation of the conductors, capacitors and grounding member from the insulating resin and thus greatly improve the withstand voltage characteristics.

Furthermore, since the insulating case has hollow cylindrical projections whose upper open ends form a recessed enclosure in line with and following the inner diameter sections, it is possible to inject the insulating resin simultaneously by pouring resin into the two hollow cylindrical projections via the recessed enclosure. The number of steps of pouring the insulating resin can thus be reduced by half, which leads to a cost reduction compared to the prior art independent type capacitor in which the insulating cases are filled separately.

Moreover, the portion of the insulating case defining the recessed enclosure in line with and following the inner diameter sections, has a flange portion adjacent to the recessed enclosure. When water drops or the like collect on the surface of the insulating case, the recessed enclosure serves as a barrier to prevent surface leaks between the conductors located on the inside, and the grounding member. Thus, it is possible to obtain a high voltage capacitor with excellent humid-conditions withstand voltage characteristics and which can be used in an environment of high relative humidity or with much dust such as in a magnetron filter for a microwave oven.

Furthermore, since the insulating case has the two hollow cylindrical projections spaced apart from each other, the space defined between the hollow cylindrical projections serves as a heat radiation zone to reduce thermal stress generated in use in a microwave oven or in heat cycle tests, thus reducing the likelihood of withstand voltage failures.

According to the second aspect of the invention, since the insulating case is made of a thermoplastic resin, its cost is inexpensive compared to the case where the insulating case is made of a thermosetting resin such as an epoxy resin or an unsaturated polyester. Besides, since the insulating case is fitted on the upper end of the outer insulating resin so that the outer insulating resin is exposed between the lower end of the insulating case and the grounding member, it can be reduced in size and material cost.

Furthermore, since the outer insulating resin is made of a thermosetting resin and the insulating case is fitted on the upper end of the outer insulating resin so that the outer insulating resin is exposed between the lower end of the insulating case and the grounding member, the surface of the outer insulating resin, which is made of a thermosetting resin having excellent tracking resistance characteristics, is exposed on the path which extends from the conductors via the surface of the insulating case to the grounding member. Thus, in spite of the use of a thermoplastic resin for the insulating case, it is possible to obtain a high voltage capacitor and a magnetron which have excellent tracking resistance characteristics.

According to the third aspect of the invention, the insulating resin is made of an epoxy type resin and provided around the through type capacitors, and the dielectric porcelain elements constituting the through type capacitors are covered with an insulating film of an epoxy or phenol type resin. The bonding strength between the dielectric porcelain elements and the insulating resin are greatly increased by the insulating film covering the dielectric porcelain elements. It is thus possible to prevent separations or cracks from occurring in the contact interface between the dielectric porcelain elements and the insulating resin, thus improving the reliability.

According to the fourth aspect of the invention, since at least either the outer insulating resin or the inner insulating resin is made of a urethane resin, at least on the side, where the urethane resin is provided, it is possible to reduce thermal stress in withstand voltage tests or heat shock tests owing to the elasticity of the urethane resin and its adhesion to the dielectric porcelain elements.

When the inner insulating resin is made of a urethane resin, it is possible to reduce thermal stress in withstand voltage tests, heat shock tests or in use owing to the elasticity of the urethane resin or its adhesion to the dielectric porcelain elements. Thus, there is no need of fitting insulating tubes to the conductors, thus reducing the number of components and the number of assembling steps.

Furthermore, since the urethane resin is inexpensive compared to the epoxy resin, it is possible to reduce the cost.

According to the fifth aspect of the invention, the outer insulating resin is provided around the through type capacitor on one side of the grounding member, and its entire outer circumference constitutes a space-partitioning contour. The inner insulating resin is provided to fill inside the through hole of the through type capacitor, and its entire outer circumference constitutes a space- partitioning contour. Thus, the outer insulating resin and inner insulating resin serve as outer casings as well, thus dispensing with the insulating case and insulating cover, which have heretofore been necessary. This means that there is no cause for the insulating resin to become separated from the dielectric porcelain element due to temperature variations in heat shock tests, heat cycle tests or in use. It is thus possible to prevent separations, gaps or cracks from occurring in the contact interface between the dielectric porcelain element of the through type capacitors and the insulating resin.

Furthermore, since neither insulating case nor insulating cover is required, it is possible to preclude problems associated with fitting these covers to the grounding member. Besides, since the insulating case and cover are dispensed with, the number of components and also the number of assembling steps are reduced, thus leading to a cost reduction.

The outer insulating resin and inner insulating resin can be formed by injection molding. It is thus possible to prevent the production of defective products due to otherwise possible flow-out of the insulating resin to the outside.

According to the sixth aspect of the invention, the dielectric porcelain elements constituting the through type capacitors have a surface grain size of 2 to 5 μm and a surface roughness of 0.2 μm or more. Thus, the bonding strength between the dielectric porcelain element and the insulating resin can be greatly improved. In specific numerical values, the bonding strength, which has been about 20 to 40 kgf/cm$^2$ in a measurement temperature range of 80° to 140° C., can be increased up to about 40 to 60 kgf/cm$^2$. Thus, it is possible to reduce the likelihood of separations, gaps or cracks occurring in the contact interface between the dielectric porcelain element of the through type capacitors and the insulating resin due to temperature variations in heat shock tests, heat cycle tests or in use, thus greatly improving reliability in reliability tests such as high temperature loading tests, moisture resistance loading tests or in use in high temperature or high relative humidity environments. In the prior art high voltage capacitor, the dielectric porcelain element has a surface grain size of 1 μm or below and a surface roughness of 0.2 μm or below.

According to the seventh aspect of the invention, at least either the outer insulating resin or the inner insulating resin is made of a urethane resin. Thus, at least on the side where the urethane resin is provided, the elasticity thereof and the adhesion thereof to the dielectric porcelain elements have an effect of reducing the likelihood of separations, gaps or cracks occurring in the contact interface between the dielectric porcelain element of the through type capacitors and the insulating resin in heat cycle tests, heat shock tests or in use, thus greatly improving the reliability in the reliability tests such as high temperature loading tests, moisture resistance loading tests or in use in high temperature or high relative humidity environments.

Furthermore, since the insulating tubes are made of an elastic resin and fitted to the portions of the conductors passing through the through holes, if the inner insulating resin is made of a urethane resin, the elasticity of the insulating tubes and that of the urethane resin provide a combined effect of further reducing the likelihood of separation occurring in the contact interface between the dielectric porcelain elements and the insulating resin.

BEST MODE FOR CARRYING OUT THE INVENTION

Figure 1:
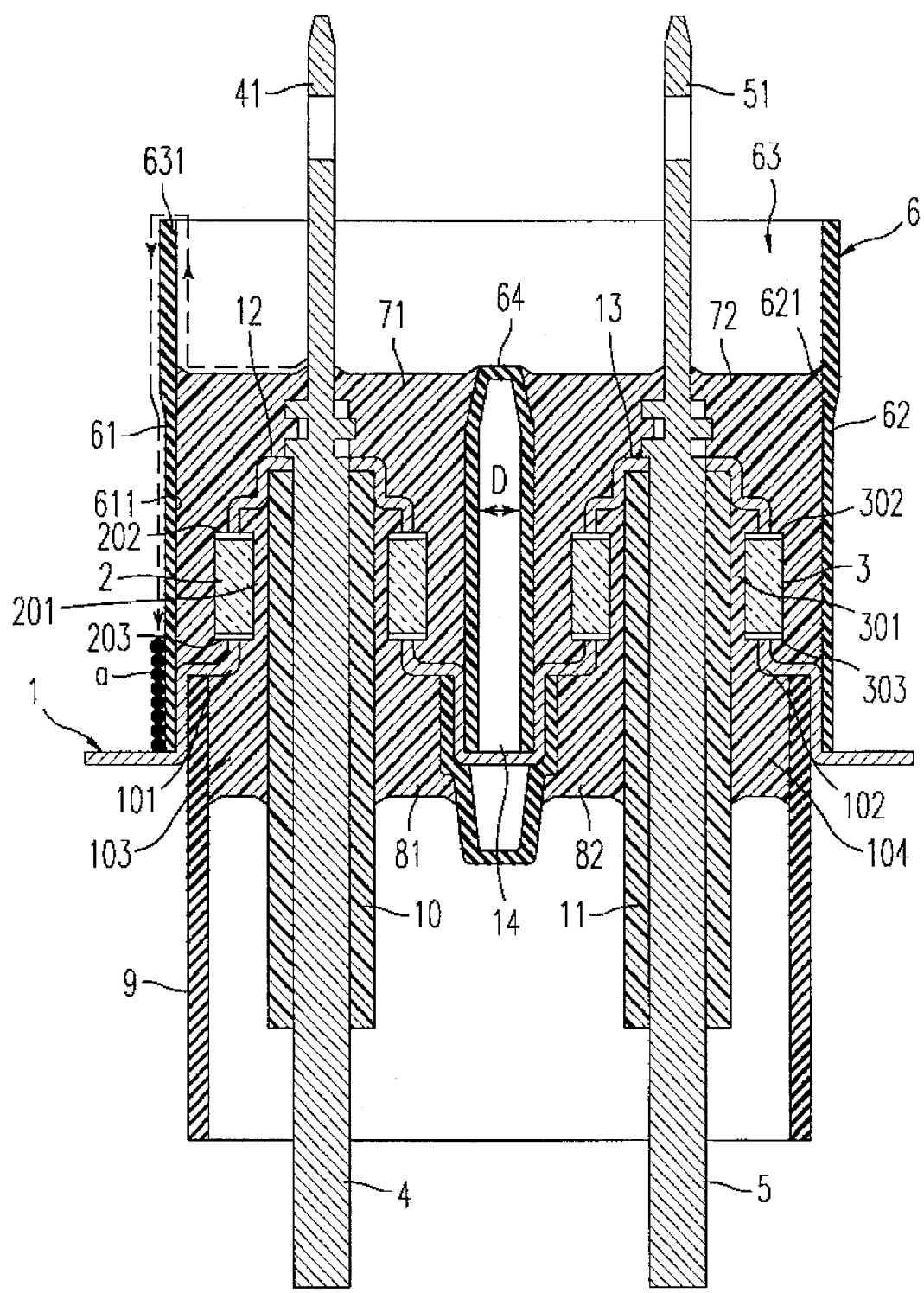
FIG. 1 is a sectional front view of the high voltage capacitor according to the first aspect of the present invention.
Figure 2:
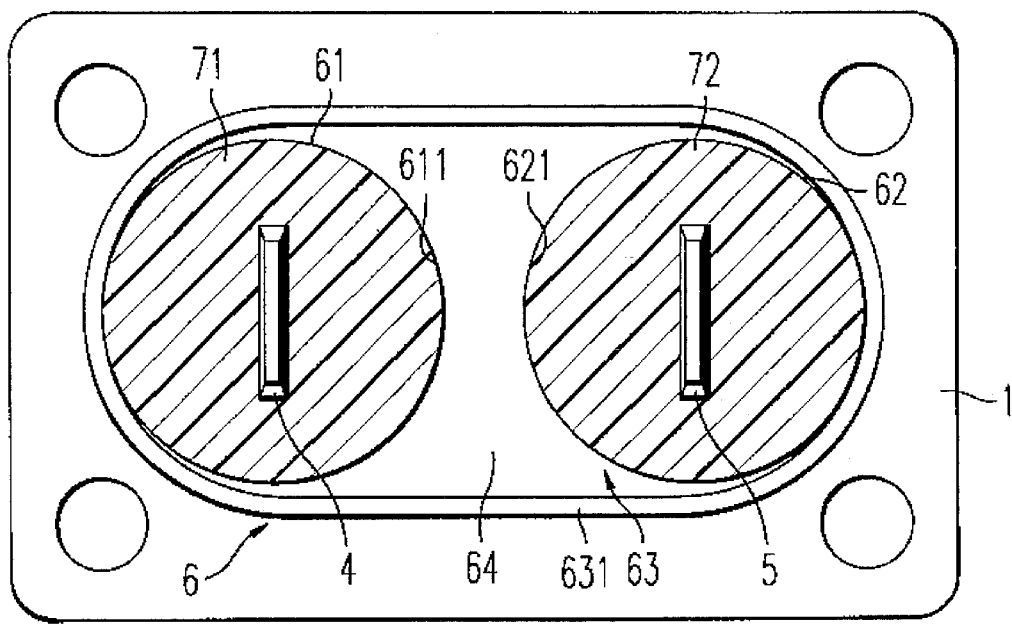
FIG. 2 is a plan view of the high voltage capacitor shown in FIG. 1.
Figure 3:
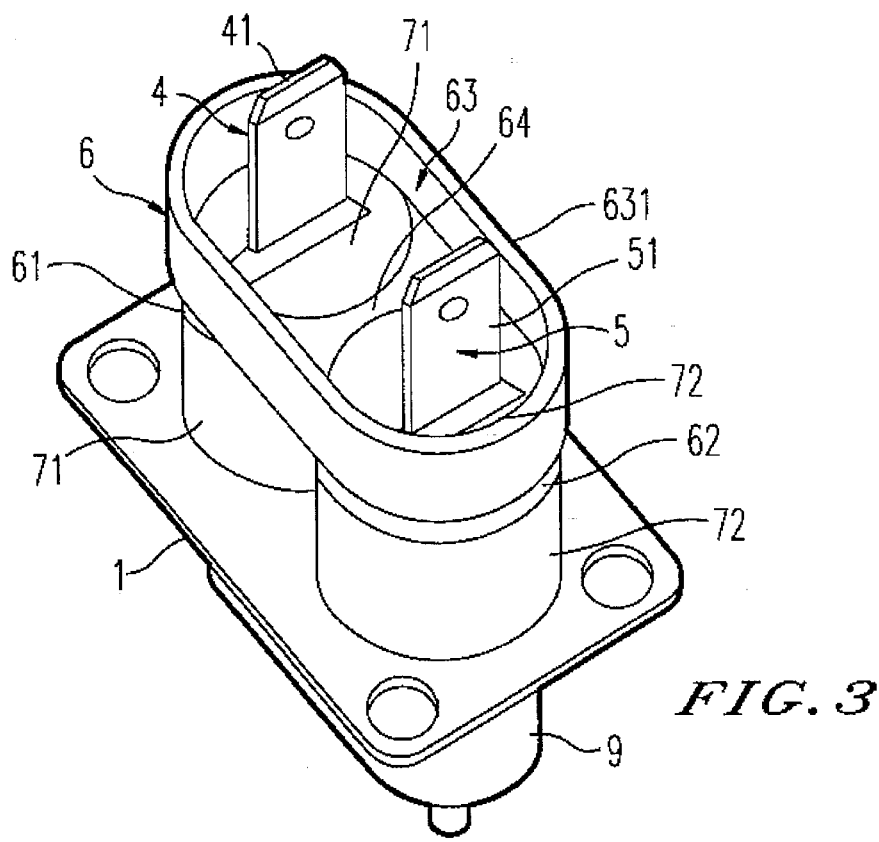
FIG. 3 is a perspective view of the high voltage capacitor shown in FIG. 1.

FIGS. 1 to 3 show the first embodiment of the present invention. Referring to the Figures, designated at 1 is a grounding member, 2 and 3 are through type capacitors, 4 and 5 are conductors passing through the respective through type capacitors 2 and 3, 6 is an insulating case, 71 and 72 is an outer insulating resin, 81 and 82 is an inner insulating resin, 9 is an insulating cover, and 10 and 11 are insulating tubes.

The grounding member 1 has two raised portions 101 and 102 formed on the same side. These raised portions 101and 102 have central holes 103 and 104 respectively and are spaced apart from each other.

The two through type capacitors 2 and 3 have through holes 201 and 301 respectively. Each capacitor also has two electrodes 202 and 203 (or 302 and 303) formed on its opposite end surfaces, where the through hole 201 (or 301) opens. The through type capacitors 2 and 3 are positioned on the raised portions 101 and 102 and the electrodes 203 and 303 are bonded to the raised portions 101 and 102 by means of soldering or the like. The capacitors 2 and 3 are made of a dielectric porcelain.

The conductors 4 and 5 pass through the through holes 201 and 301 respectively of the capacitors 2 and 3 and are independently connected to the electrodes 202 and. 302 thereof. They also pass through the holes 103 and 104 of the raised portions 101 and 102 of the grounding member 1 in a contact-free state, and their opposite end portions are led out to the outside.

Designated at 12 and 13 are electrode connection members used to connect the conductors 4 and 5 to electrodes 202 and 203, respectively. The conductors 4 and 5 have terminal sections 41 and 51 at their upper ends (in the Figure).

The insulating case 6 has two hollow cylindrical projections 61 and 62, which are spaced apart by a distance D. The hollow cylindrical projections 61 and 62 have their upper open ends joined by a joining portion 64, and the insulating case has a recessed enclosure 63 in line with and following inner diameter sections 611 and 621. The hollow cylindrical projections 61 and 62 have their lower open end portions fitted on the outer circumferences of the raised portions 101 and 102. The capacitors 2 and 3 are housed within the inner diameter sections 611 and 621.

The outer insulating resin 71 and 72 is provided around the through type capacitors 2 and 3 housed within the diameter sections 611 and 621. The outer insulating resin should fill in the area, not spreading too far upward or downward from the joining portion 64 of the insulating case 6. The inner insulating resin 81 and 82 is provided on the side of the grounding member 1 opposite the outer insulating resin 71 and 72. The insulating resins 71 and 72, and 81 and 82 may be composed of a thermosetting or thermoplastic resin such as a polymer with or without an inorganic filler mixed in.

As explained above, the grounding member 1 has the two raised portions 101 and 102 formed on the same side. The two through type capacitors 2 and 3 have the through holes 201 and 301 respectively and each capacitor has electrodes 202 and 203 (or 302 and 303) on the opposite end surfaces, where the through hole 201 (or 301) opens. The through type capacitors 2 and 3 are disposed on the raised portions 101 and 102 with their electrodes 203 and 303 bonded thereto. The conductors 4 and 5 are provided for the capacitors 2 and 3 so that they pass through the through holes 201 and 301 and are independently connected to the electrodes 202 and 302. This structure is thus a high voltage capacitor of independent capacitor type. Thus, compared to the two-ganged high voltage capacitor structure, the likelihood of separation at the interface can be reduced. In addition, the likelihood of withstand voltage failure can be reduced. Also, it is possible to reduce the size and cost.

Furthermore, since the through type capacitors 2 and 3 are disposed in the hollow cylindrical projections 61 and 62 of the insulating case 6 and the outer insulating resin 71 and 72 is provided around the capacitors 2 and 3 in the inner diameter sections 611 and 621, it is possible to ensure moisture resistance and electric insulation owing to the outer insulating resin 71 and 72. The outer insulating resin 71 and 72 is formed by pouring a minimum necessary quantity of resin, and only into the hollow cylindrical projections 61 and 62, and the outer insulating resin 71 and 72 is independent of each other in their respective hollow cylindrical projections 61 and 62. Furthermore, since the two hollow cylindrical projections 61 and 62 of the insulating case 6 are spaced apart by the distance D, a space 14 defined between the projections 61 and 62 serves as a heat radiation zone, thus reducing thermal stress generated when the high voltage capacitor of the present invention is mounted in a microwave oven or tested in heat cycle tests. Thus, it is possible to reduce withstand voltage failures or the like.

Furthermore, since the two hollow cylindrical projections 61 and 62 of the insulating case 6 have their upper open ends joined and their lower open end portions fitted on the outer circumferences of the raised portions 101 and 102 of the grounding member 1, it is possible to obtain a structure, in which the insulating case 6 is integrated at the top and also at the bottom as a unit. This has an effect of providing for increased mechanical reinforcement for the capacitors 2 and 3 and conductors 4 and 5 which are disposed in the inner diameter sections 611 and 621 of the hollow cylindrical projections 61 and 62 and thus reducing the likelihood of looseness of the conductors 4 and 5. It is thus possible to reduce the likelihood of interface separation of the conductors 4 and 5, capacitors 2 and 3 and grounding member 1 from the outer insulating resin 71 and 72 and thus greatly improve the withstand voltage characteristic.

Furthermore, since the insulating case 6 has the recessed enclosure 63 which is in line with and following the inner diameter sections 611 and 621 of the two hollow cylindrical projections 61 and 62, it is possible to form the outer insulating resin 71 and 72 simultaneously by pouring resin into the two hollow cylindrical projections 61 and 62 via the recessed enclosure 63. This means that the number of steps of pouring the insulating resin can be reduced by half, which leads to a cost reduction.

Furthermore, the insulating case 6 has the recessed enclosure 63 which is in line with and following the inner diameter sections 611 and 621 of the two hollow cylindrical projections 61 and 62 has a flange portion 631 adjacent to the recessed enclosure. When water drops or the like collect on the surface of the :insulating case 6, the flange portion 631 serves as a barrier to prevent leaks between the conductors 4 and 5 housed within and the grounding member 1. Thus, it is possible to obtain a high voltage capacitor, with superior humid-conditions withstand voltage characteristics and can be used successfully in an environment of high relative humidity or with much dust such as in a magnetron filter for a microwave oven.

Now, a second embodiment of the invention will be described with reference to FIG. 4. In the Figure, reference numerals designating the same parts as those in FIGS. 1 to 3 are the same. The grounding member 1 has two raised portions 101 and 102 formed on one side, the raised portions 101 and 102 having holes 103 and 104 respectively. The through type capacitors 2 and 3 have through holes 201 and 301 respectively, and each of them also has electrodes 202 and 203 (or 302 and 303) formed on its opposite end surfaces, where the through hole 201 (or 301) opens. The capacitors are disposed on the raised portions 101 and 102 with their electrodes 203 and 303 bonded thereto. The conductors 4 and 5 pass through the through holes 201 and 301 and are connected to the electrodes 202 and 302 respectively.

The outer insulating resin 71 and 72 is composed of a thermosetting resin such as an epoxy resin or an unsaturated polyester resin, and is provided around the through type capacitors 2 and 3 on one side of the grounding member 1. The inner resin 81 and 82 is provided on the other side of the grounding member 1.

The insulating case 6 is composed of a thermoplastic resin such as PBT, and is fitted on the upper end of each of the outer insulating resin 71 and 72 so that the outer insulating resin 71 and 72 is exposed between its lower end 610 and the grounding member 1.

Since the insulating case 6 is made of a thermoplastic resin, its cost is low compared to a structure in which the case is made of a thermosetting resin such as an epoxy resin or an unsaturated polyester resin. Besides, since the insulating case 6 is fitted on the upper end of the outer insulating resin 71 and 72 so that the resin 71 and 72 is exposed between its lower end 610 and the grounding member 1, it can be reduced in size and its material cost.

Furthermore, since the outer insulating resin 71 and 72 is made of a thermosetting resin and the insulating case 6 is fitted on the upper end of the outer insulating resin 71 and 72 so that the resin 71 and 72 is exposed between its lower end 610 and the grounding member 1, the surface of the resin 71 and 72 which is made of a thermosetting resin having excellent tracking resistance characteristics, is exposed on a path which extends from the conductors 4 and 5 via the surface of the insulating case 6 to the grounding member 1. Thus, it is possible to obtain a high voltage capacitor and a magnetron, which have excellent tracking resistance.

Figure 4:
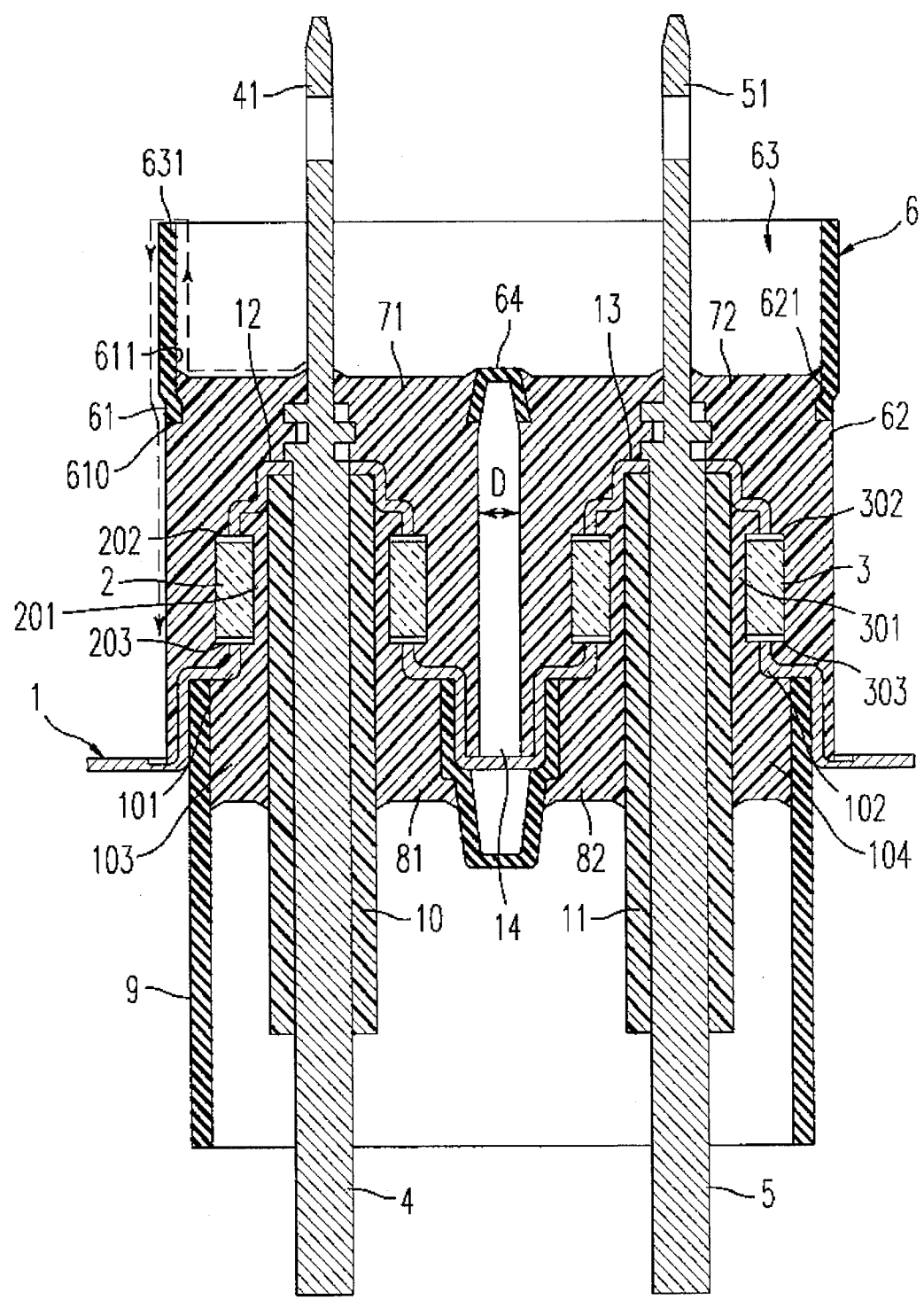
FIG. 4 is a sectional front view of the high voltage capacitor according to the second aspect of the present invention.
Figure 5:
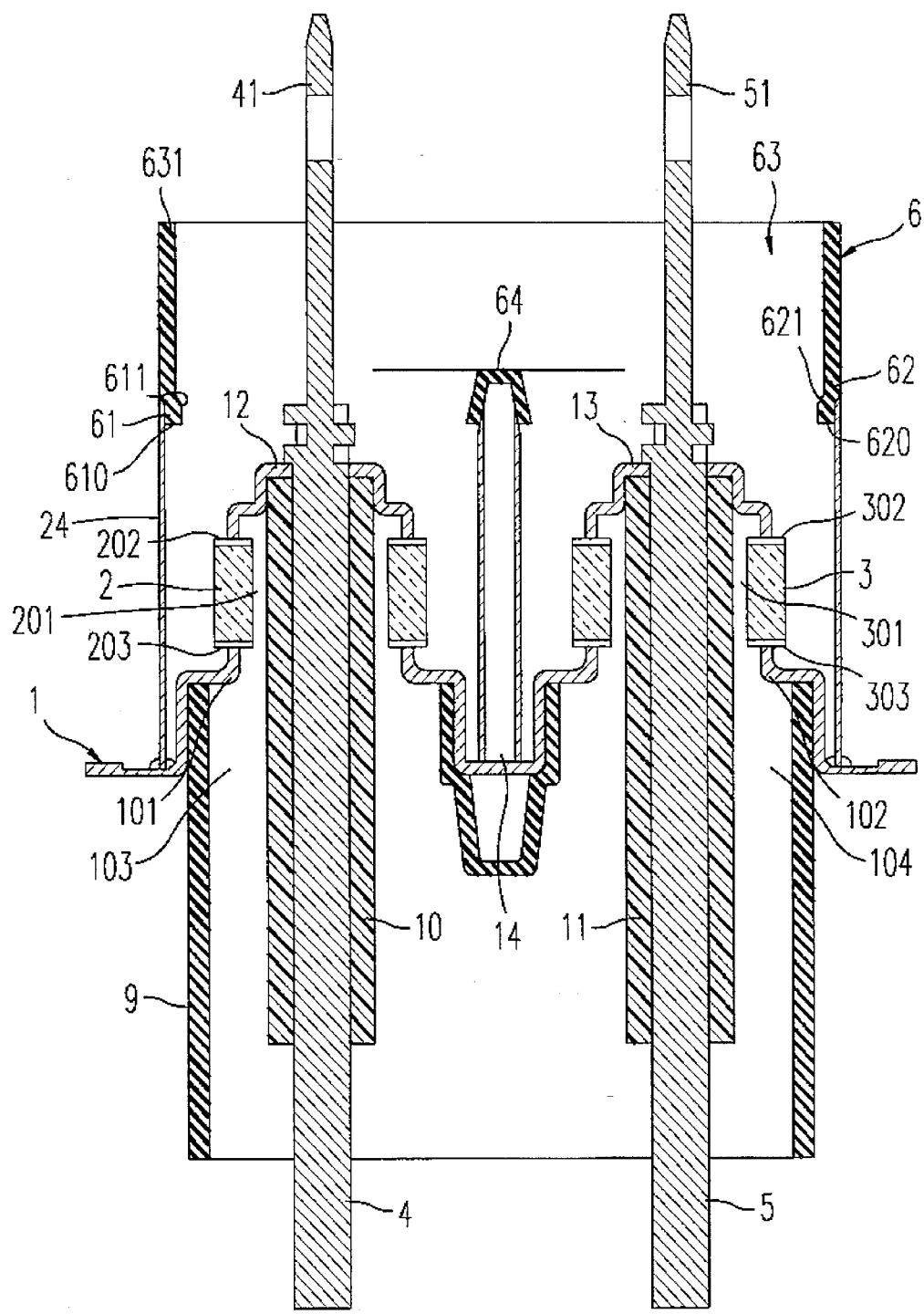
FIG. 5 is a view showing an example of manufacturing process of the high voltage capacitor shown in FIG. 4.
Figure 6:
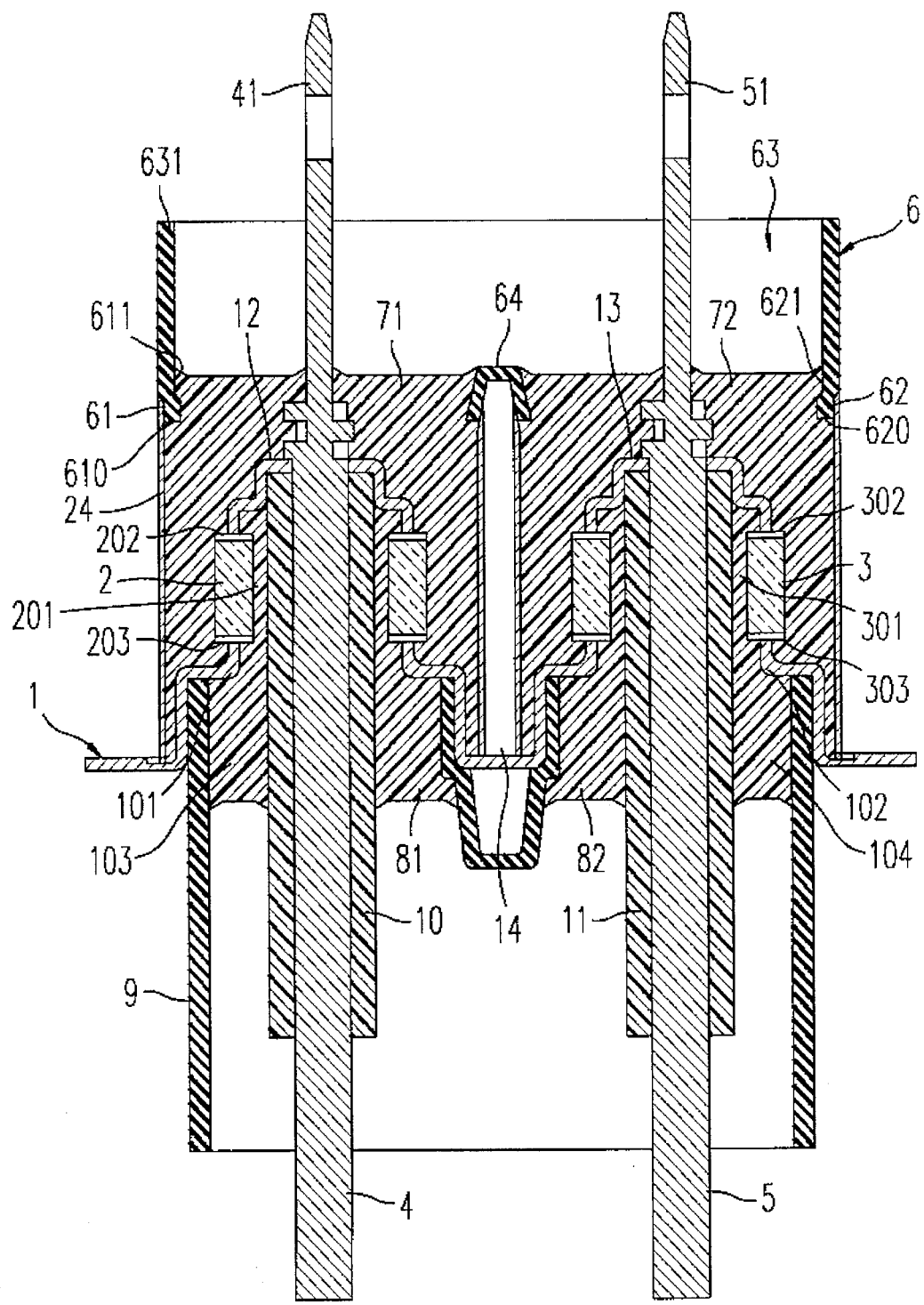
FIG. 6 is a view showing again the example of manufacturing process of the high voltage capacitor shown in FIG. 4.

FIGS. 5 and 6 show examples of a manufacturing process of the second embodiment of the high voltage capacitor shown in FIG. 4. As shown in FIG. 5, a case-like mold 24 is disposed on the grounding member 1 such as to surround the through type capacitors 2 and 3. The mold 24 composed of polypropyrene or the like. It is sealed to the grounding member 1 by press fitting or by bonding using an adhesive. The insulating case 6 is fitted on the upper end of the case-like mold 24.

Then, as shown in FIG. 6, the outer insulating resin 71 and 72 is formed in the spaces defined by the insulating case 6 and case-like mold 24. The inner insulating resin 81 and 82 is formed before or after the formation of the outer insulating resin 71 and 72.

Afterwards, the case-like mold 24 is removed to obtain the high voltage capacitor as shown in FIG. 4.

Figure 7:
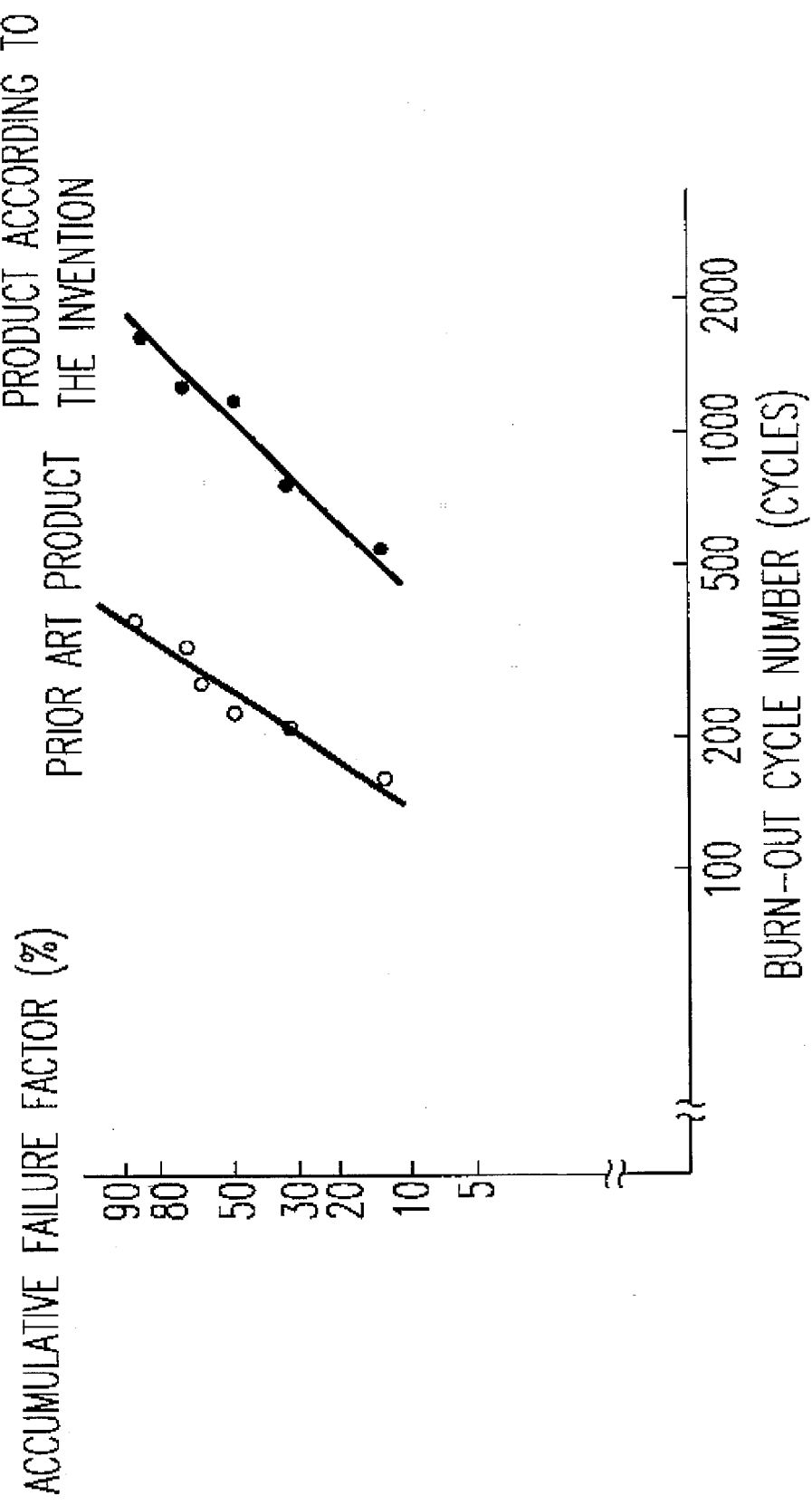
FIG. 7 is a graph showing numerical data on accumulative failure factor versus burn-out cycle for the high voltage capacitor shown in FIG. 4 (product according to the present invention) and a prior art high voltage capacitor (prior art product)

FIG. 7 is a graph showing accumulative failure factor versus burn-out cycle number data of the second embodiment of the high voltage capacitor according to the invention (product according to the present invention) and a prior art high voltage capacitor (prior art product). The data were obtained by carrying out tests, in which the products were humidified using a supersonic humidifier. To each product was applied a secondary source voltage of a microwave oven in a cycle of being "on" for 30 seconds and then "off" for 30 seconds, and the test was continued until the insulating case surface was burnt out.

As the data in FIG. 7 indicates, with the prior art product the accumulative failure factor exceeds 90% before the burn-out cycle number reaches 500. In contrast, with the product according to the present invention the accumulative failure factor is around 10% at 500 burn-out cycles, thus indicating a significant improvement of the humid-conditions withstand voltage characteristics.

Figure 8:
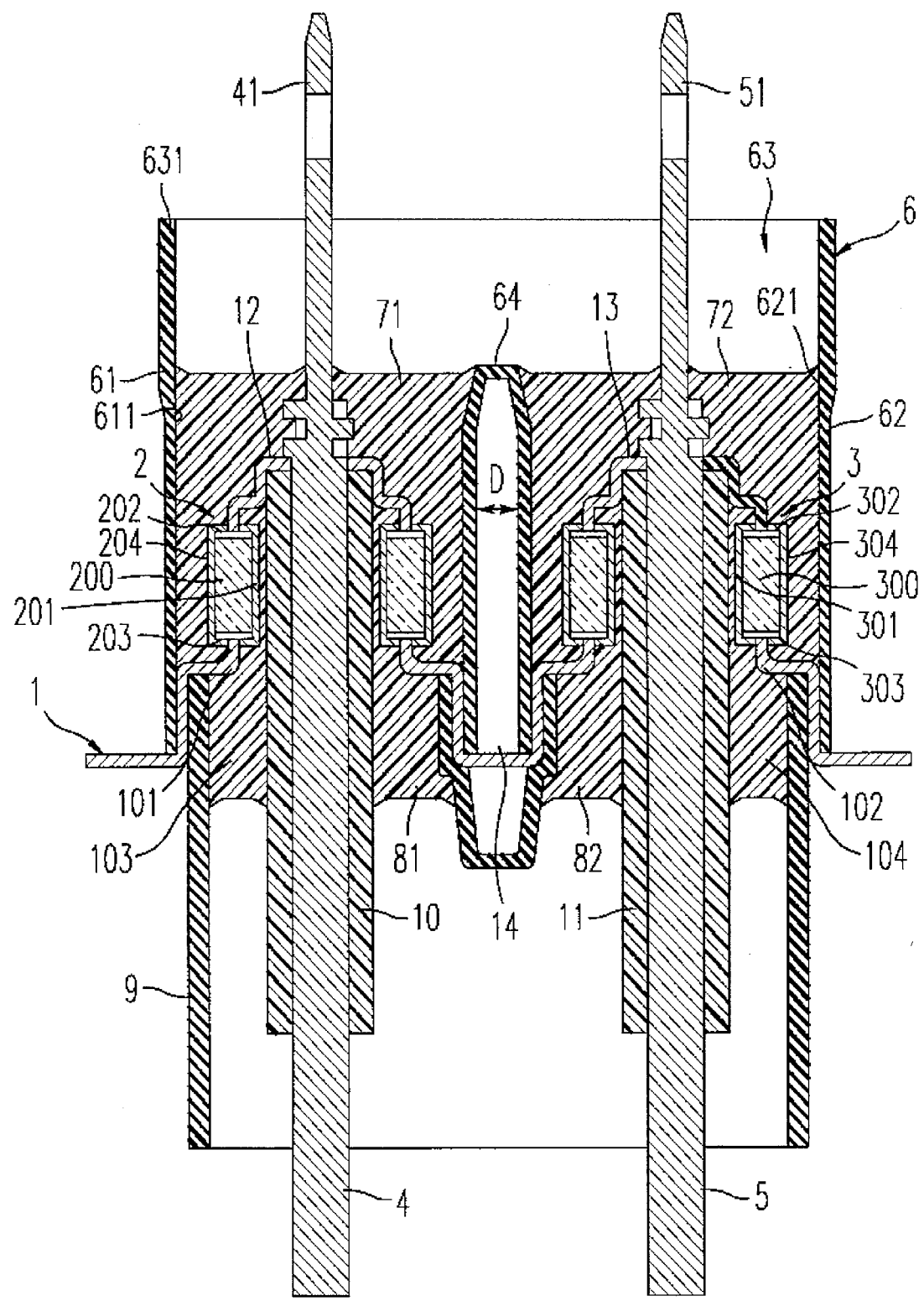
FIG. 8 is a sectional front view of the high voltage capacitor according to the third aspect of the present invention.

Now, a third embodiment of the invention will be described with reference to FIG. 8. In the Figure, reference numerals are the same as those in FIGS. 1 and 4, and designate the same parts. The outer insulating resin 71 and 72 is composed of an epoxy type resin, and is provided around through type capacitors 2 and 3, and the inner insulating resin 81 and 82 is provided on the other side of grounding member 1 so that they fill the through holes 201 and 301 of the capacitors 2 and 3.

The dielectric porcelain elements 200 and 300 constituting the capacitors 2 and 3 are covered by :insulating films 204 and 304 made of an epoxy or phenol type resin. As shown above, with the provision of the insulating films 204 and 304 of an epoxy or phenol type resin covering the surfaces of the dielectric porcelain elements 200 and 300 of the through type capacitors 2 and 3, the close contact strength and bonding strength between the dielectric porcelain 200 and 300 and the insulating resins 71 and 72, and 81 and 82 are greatly increased by the insulating films 204 and 304 covering the dielectric porcelain elements 200 and 300. It is thus possible to prevent separation or cracks from occurring in the contact interface between the dielectric porcelain elements 200 and 300 and the insulating resins 71 and 72, and 81 and 82, thus improving the reliability.

Figures 11, 12:
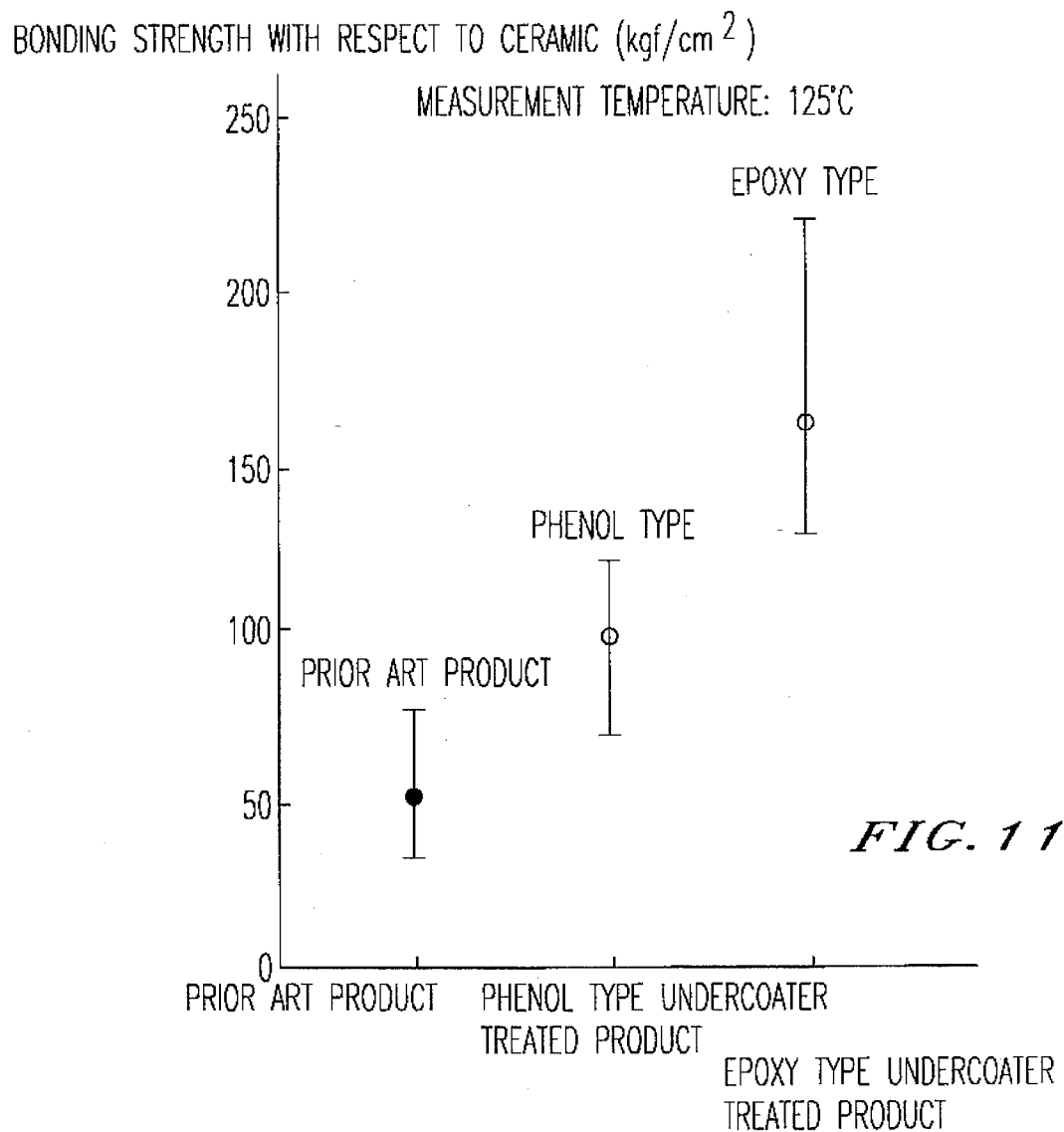
FIG. 11 is a view showing data of actual measurement of the bonding strength between the dielectric porcelain element and the insulating resin in an embodiment according to the third aspect of the present invention.
FIG. 12 is a view showing high temperature loading test data on a third embodiment of the present invention.

FIG. 11 shows data obtained by actual measurement of the bonding strength between the dielectric porcelain elements 200 and 300 of the through type capacitors and the insulating resins 71 and 72, and 81 and 82. In the Figure, "the Prior art product" is data representing a prior art capacitor without the insulating films 204 and 304 covering the dielectric porcelain elements 200 and 300. The Product treated with a phenol-type undercoat, is data representing a capacitor using a phenol-type resin for the insulating films 204 and 304. The Product treated with an epoxy-type undercoat is data representing a capacitor using an epoxy type resin for the insulating films 204 and 304. As is seen, with the prior art product the average bonding strength is about 50 kgf/cm$^2$. In contrast, with the product treated with phenol type undercoat, which is a product according to the present invention, the average bonding strength is 100 kgf/cm$^2$, while it is 150 kgf/cm$^2$ with the product treated with epoxy type undercoat which is again a product according to the present invention.

FIG. 12 is a diagram showing high temperature loading test data. The prior art product underwent electrical breakdown, presumably due to separation of the insulating resin after about 2000 hours had elapsed. In contrast, the products treated with phenol and epoxy type undercoat as the products according to the present invention did not undergo any electrical breakdown after 3000 hours had elapsed. Thus, it will be seen that according to the present invention a high voltage capacitor can be obtained, which features high bonding strength, resulting in reduced likelihood of separation or cracks occurring in the insulating resin and having high durability and reliability.

Figure 9:
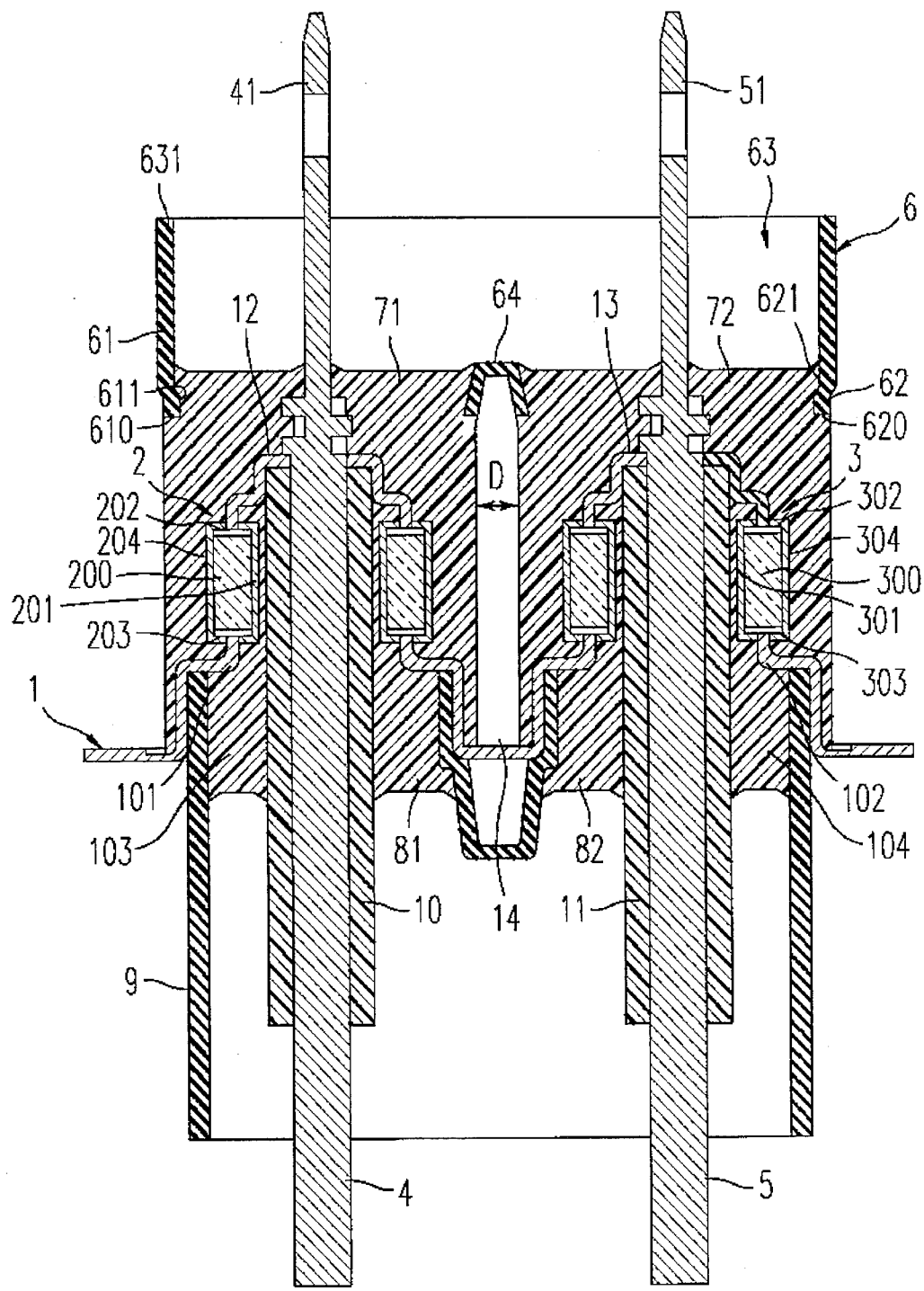
FIG. 9 is a sectional front view showing another embodiment of the high voltage capacitor according to the third aspect of the present invention.

Another embodiment of the high voltage capacitor according to the third aspect of the present invention will now be described with reference to FIG. 9. In the Figure, reference numerals are the same as those in the preceding Figures and designate the same parts. A feature of this embodiment is the fact that insulating case 6 is fitted on the upper end of the outer insulating resin 71 and 72 so that the outer insulating resin 71 and 72 is exposed between the lower end 610 of the insulating case 6 and grounding member 1. With this structure, the insulating case 6 may be made of an inexpensive thermoplastic resin for cost reduction. In addition, with the outer insulating resin 71 and 72 being composed of an epoxy type resin with excellent tracking resistance characteristics and being exposed on the path and extending from conductors 4 and 5 to the grounding member 1, it is possible to obtain a high voltage capacitor having excellent tracking resistance.

Figure 10:
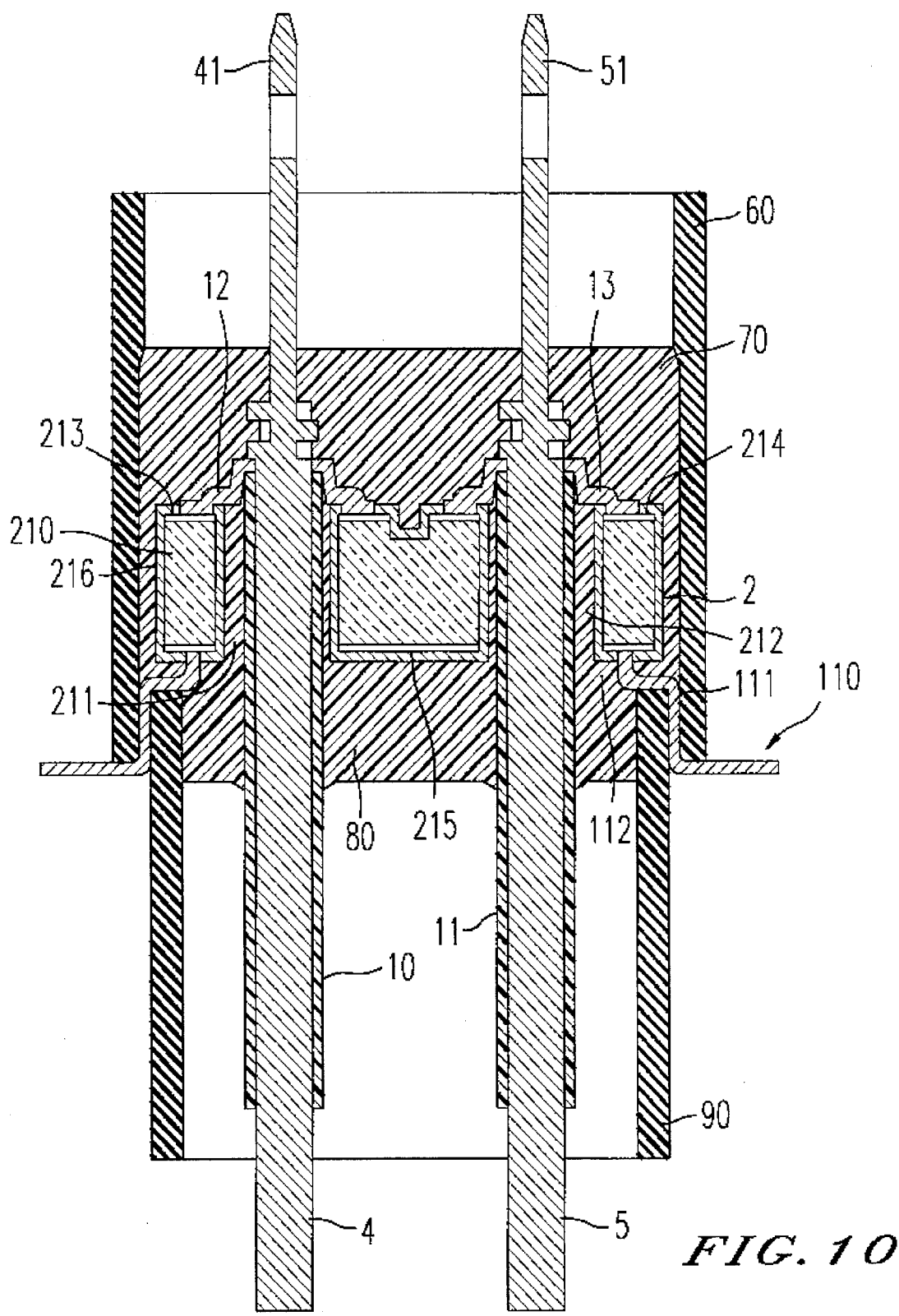
FIG. 10 is a sectional front view showing yet another embodiment of the high voltage capacitor according to the third aspect of the present invention.

FIG. 10 shows another embodiment of the high voltage capacitor according to the third aspect of the present invention. This embodiment comprises a single through type capacitor 2 constituted of a dielectric porcelain element 210 having two spaced-apart through holes 211 and 212. On one of the two surfaces of the element 210, where the through holes 211 and 212 are open, two independent electrodes 213 and 214 are provided so that they surround the respective through holes 211 and 212 respectively. On the other surface of the element 210, a common electrode 215 is provided, which is shared by the independent electrodes 213 and 214. The common electrode 215 is bonded by means of soldering or the like to a raised portion 111 of the grounding member 110. Conductors 4 and 5, which are clad with insulating tubes 10 and 11, pass through the through holes 211 and 212 respectively of the through type capacitor 2 and also through the through hole 112 of the grounding member 110. The conductors 4 and 5 are soldered via electrode connection members 12 and 13 to the independent electrodes 213 and 214 of the through type capacitor 2. An insulating case 60 is fitted on the outer circumference of the raised portion 111 so as to surround the through type capacitor 2. An insulating cover 90 is fitted in the raised portion 111 on the other side thereof so as to surround the conductors 4 and 5. Insulating resin 70 and 80 are composed of a thermosetting resin, such as an epoxy type resin, and are provided on the outer and inner sides of the through type capacitor 2, which is surrounded by the insulating case 60 and the insulating cover 90.

Figure 13:
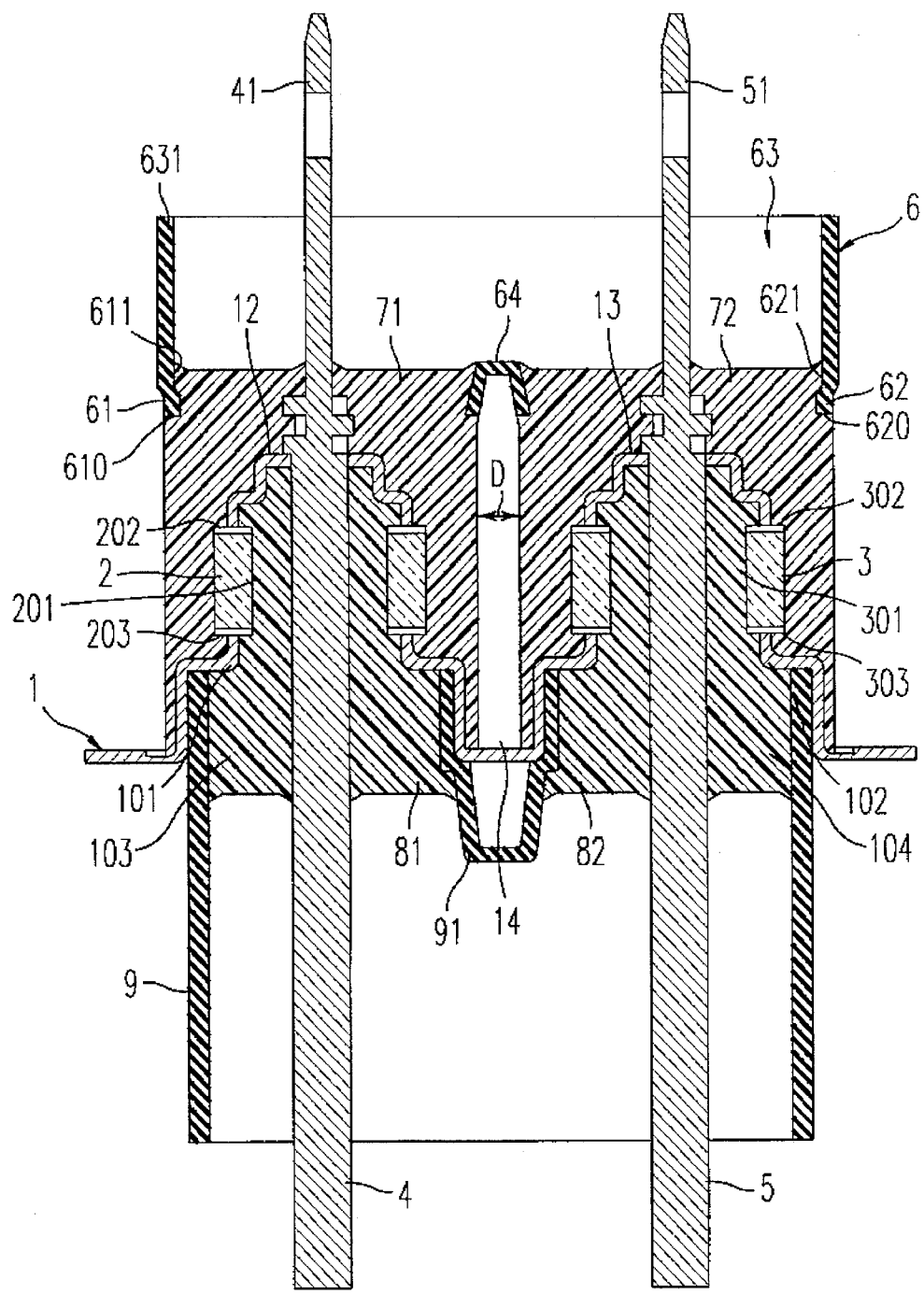
FIG. 13 is a sectional front view showing a fourth embodiment of the high voltage capacitor according to the present invention.

Now, a fourth embodiment of the present invention will be described with reference to FIG. 13. In the Figure, reference numerals are the same as those in the preceding Figures and designate the same parts. This high voltage capacitor has basically the same structure as the high voltage capacitor shown in FIG. 4 except that conductors 4 and 5 are not clad by any insulating tubes.

The outer insulating resin 71 and 72 is composed of a thermosetting resin such as an epoxy or unsaturated polyester resin, and is provided around through type capacitors 2 and 3 on one side of grounding member 1.

The inner insulating resin 81 and 82 is composed of a urethane resin, and fills through holes 201 and 301 of the through type capacitors 2 and 3 and covers the conductors 4 and 5.

With this structure, the elasticity of the inner insulating urethane resin 81 and 82 and the adhesion thereof with the porcelain elements of the through type capacitors 2 and 3 has an effect of alleviating thermal stress generated in withstand voltage tests or heat shock tests or in use. Thus, the conductors 4 and 5 need not be covered with insulating tubes, resulting in a reduction of the number of components and also the number of assembling steps.

Besides, since the urethane resin is inexpensive compared to epoxy resin, it is possible to reduce the cost. Although not shown, the outer insulating resin 71 and 72 may be made of a urethane resin instead of a thermosetting resin such as an epoxy or unsaturated polyester resin. In this case, the outer insulating resin 71 and 72 also has an effect of alleviating thermal stress generated in withstand voltage tests or heat shock tests or in use owing to the elasticity of the urethane resin and the adhesion thereof with the porcelain elements, thus permitting further reduction in cost.

The insulating case 6 is made of a thermoplastic resin such as polybutylene telephthalate (PBT) or a thermosetting resin such as an epoxy resin. It is fitted on the upper end of the outer insulating resin 71 and 72 so that the outer insulating resin 71 and 72 is exposed between its lower end 610 and the grounding member 1.

The inner insulating resin 81 and 82 is made of a urethane resin and is provided on the side of the grounding member 1 opposite the outer insulating resin 71 and 72. Inner insulating resin 81 and inner insulating resin 82 are separated from each other by a partitioning member 91 provided on the insulating cover 9. The partitioning member 91 has an effect of interrupting mutual stress interference between the inner insulating resin 81 and inner insulating resin 82, thus reducing the likelihood of interface separation of the conductors 4 and 5 and insulating cover 9 from the inner insulating resin 81 and 82.

Although not shown, the fourth aspect of the present invention can be applied broadly to the high voltage capacitors having the structures shown in FIGS. 1 through 10.

Figure 14:
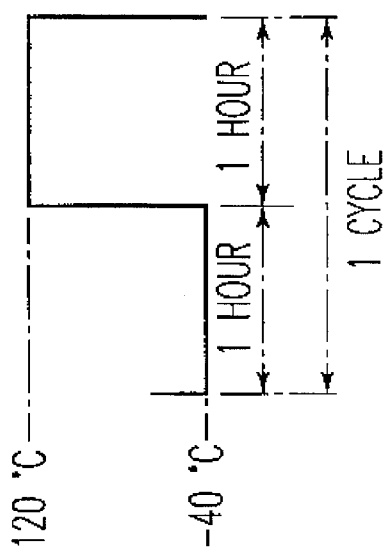
FIG. 14 is a graph showing heat shock test data on a fourth embodiment of the present invention.

FIG. 14 shows heat shock test data obtained from an embodiment of the fourth aspect of the present invention. Sample 1 is a prior art product, which has conductors clad with insulating tubes of silicone rubber and inner insulating resin composed of an epoxy resin. Sample 2 is a product, which has bare conductors, i.e., conductors without any silicone rubber insulating tube covering them, and inner insulating resin composed of an epoxy resin. Sample 3 is a product according to the present invention, which has conductors without any silicone rubber insulating tube cover and inner insulating resin composed of a urethane resin. The heat shock test was conducted by setting a cycle pattern of one hour at −40° C. and followed by one hour at 120 ° C. An AC withstand voltage test was conducted for every 10 cycles of this pattern.

As is obvious from the test data shown in FIG. 14, Sample 3, which is a product according to the present invention, has heat shock resistance characteristics comparable to that of Sample 1, which is a prior art product. With Sample 2, which has conductors without any silicone rubber insulating tubes and inner insulating resin composed of an epoxy resin, withstand voltage failure due to heat shock takes place after about 10 cycles.

Figure 15:
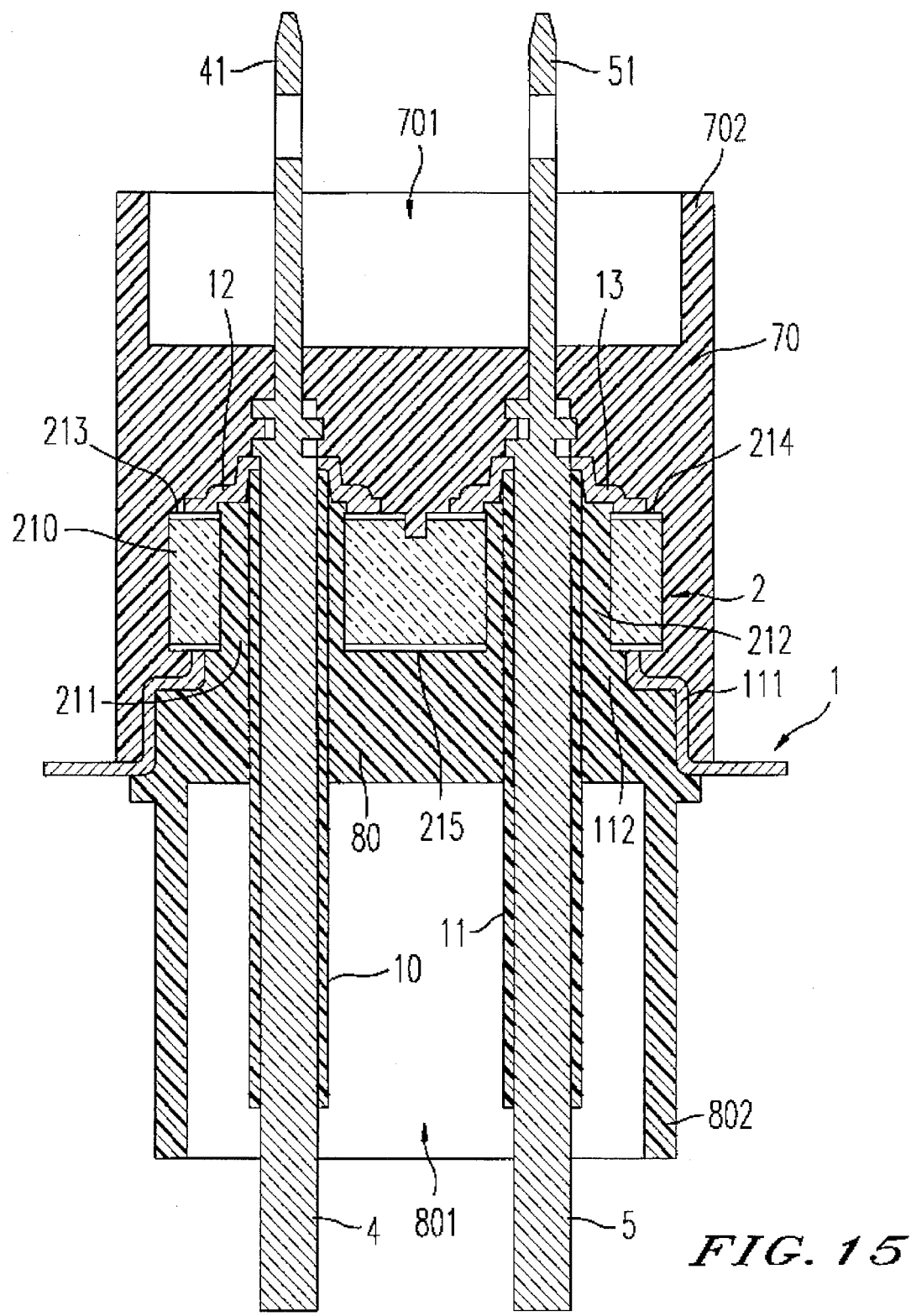
FIG. 15 is a sectional front view showing a fifth embodiment of the high voltage capacitor according to the present invention.

Now, an embodiment of the fifth aspect of the present invention will be described with reference to FIG. 15. Designated at 70 is the outer insulating resin, and at 80 the inner insulating resin. The outer insulating resin 70 is provided around through type capacitor 2 on one side of grounding member 1, and its entire outer circumference constitutes a space-partitioning contour. The inner insulating resin 80 fills through holes 211 and 212 of the through type capacitor 2 on the other side of the grounding member 1. Its entire outer circumference also has a space-partitioning contour.

Thus the outer insulating resin 70 and the inner insulating resin 80 also serve as outer fittings, and therefore, neither an insulating case nor an insulating cover is required. This means that there is no cause for separation of the outer and inner insulating resins 70 and 80 from the dielectric porcelain element 210 due to temperature variations in heat shock tests or heat cycle tests or in use. It is thus possible to prevent separation, gaps or cracks from occurring at the contact interface between the dielectric porcelain element 210 of the through type capacitor 2 and the outer insulating resin 70 and the inner insulating resin 80.

Furthermore, since neither an insulating case nor an insulating cover is provided, it is possible to preclude problems that are present in the case where an insulating case or cover is fitted on or in the grounding member 1. Besides, since the insulating case and cover are dispensed with, the number of components and assembling steps are reduced, leading to a cost reduction.

The outer insulating resin 70 and and the inner insulating resin 80 can be formed by injection molding. It is thus possible to prevent defective products being produced due to otherwise possible flow-out of the insulating resin to the outside.

In the illustrated structure, the outer insulating resin 70 has a recessed enclosure 701, through which conductors 4 and 5 are led out, and also has a frame portion 702 defining the recessed enclosure 701. Likewise, the inner insulating resin 80 has a recessed enclosure 801, through which the conductors 4 and 5 are led out, and also has a frame portion 802 defining the recessed enclosure 801. Thus, a structure similar to a prior art high voltage capacitor having an insulating case and an insulating cover may be realized without provision of any insulating case or cover.

Figure 16:
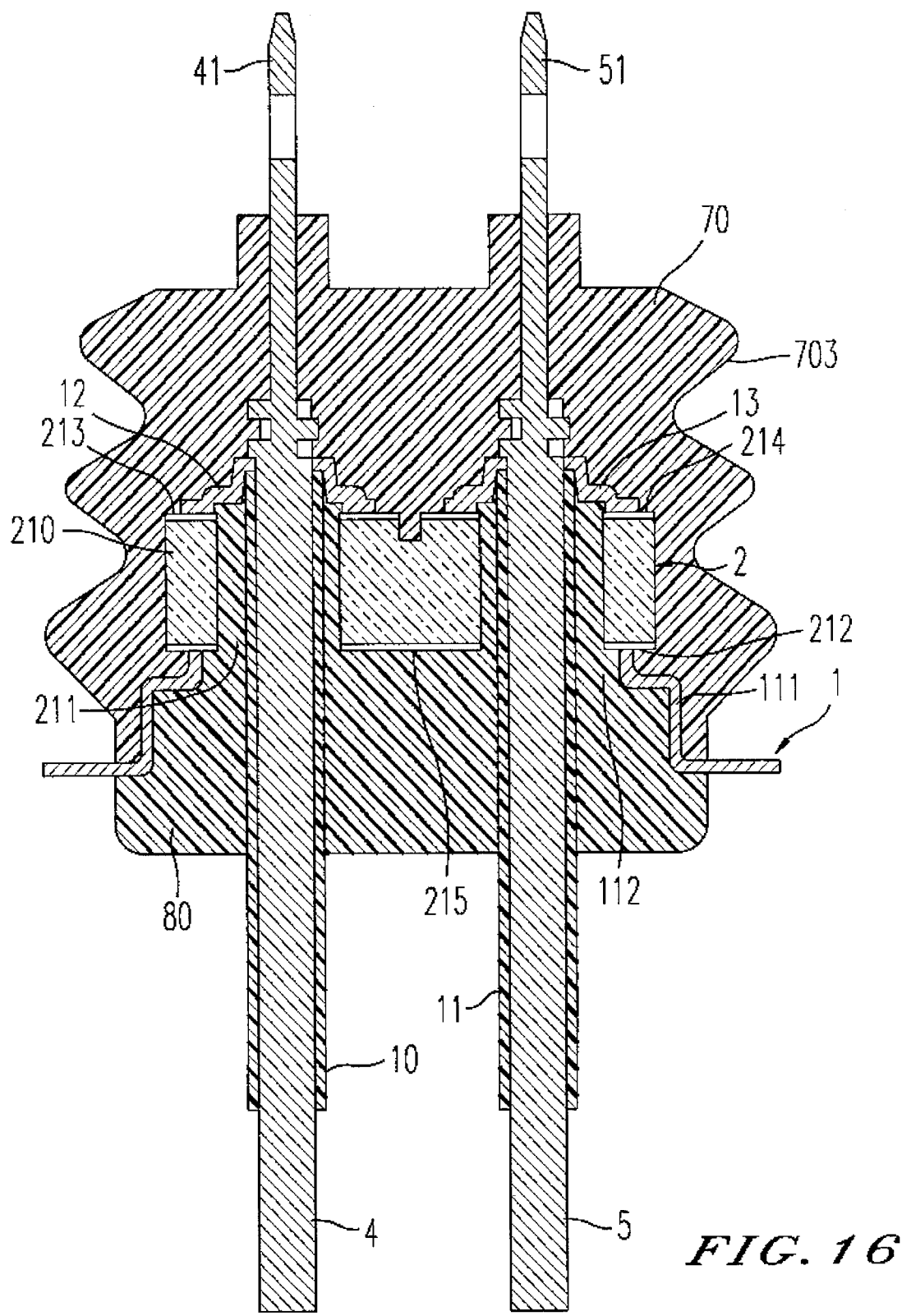
FIG. 16 is a sectional front view showing another embodiment of the high voltage capacitor according to the fifth aspect of the present invention.

FIG. 16 shows another embodiment of the high voltage capacitor according to the fifth aspect of the present invention. In this instance, the outer circumference of the outer insulating resin 70 has fins 703. With this structure, it is possible to increase the creeping distance from the conductors 4 and 5 to the grounding member 1.

Figure 17:
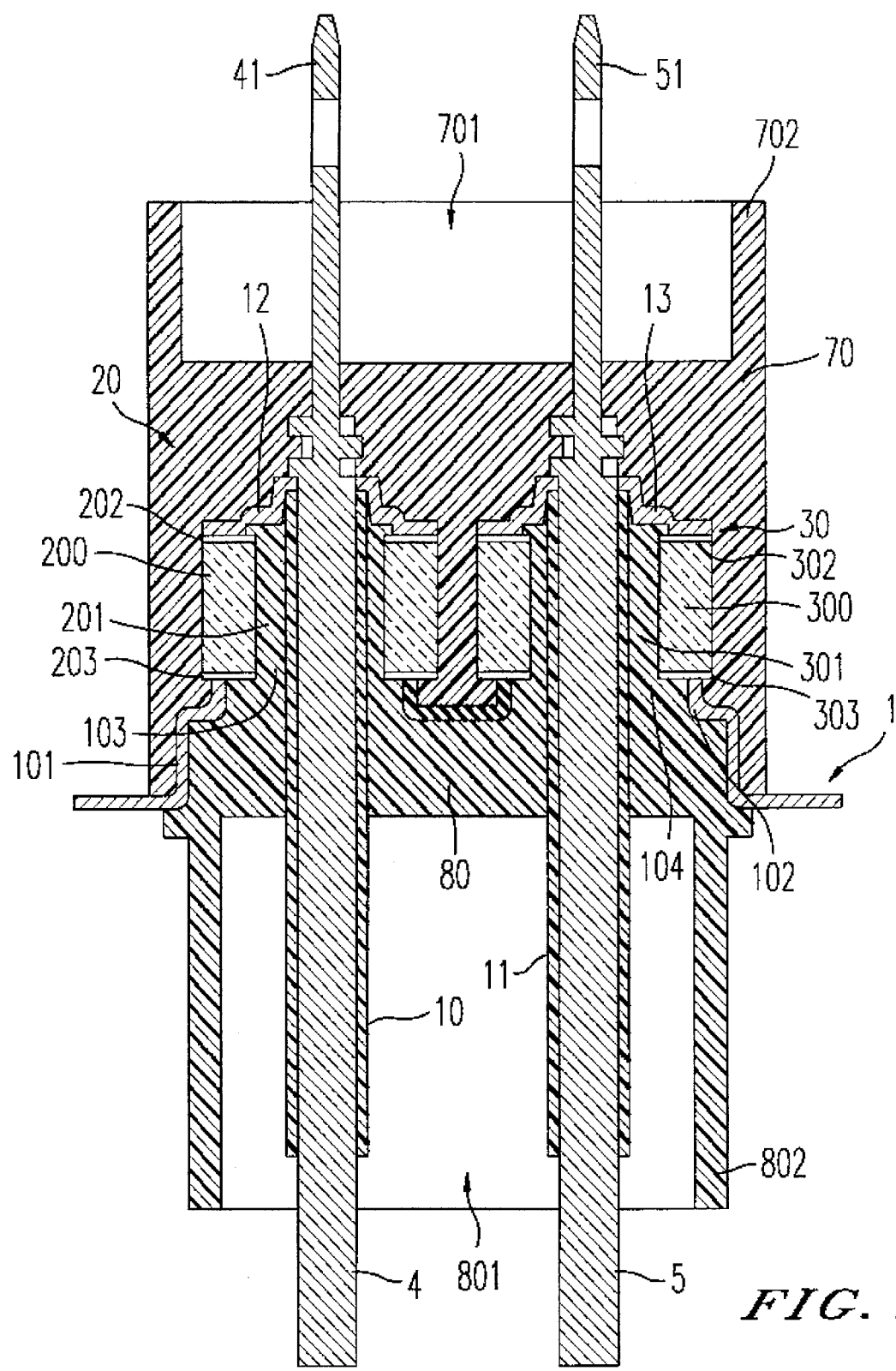
FIG. 17 is a sectional front view showing yet another embodiment of the high voltage capacitor according to the fifth aspect of the present invention.

FIG. 17 shows yet another embodiment of the high voltage capacitor according to the fifth aspect of the present invention. The grounding member 1 has two raised portions 101 and 102 formed on the same side. The raised portions 101 and 102 have respective central holes 103 and 104 and are spaced apart from each other.

Two through type capacitors 200 and 300 are each disposed on each of the raised portions 101 and 102. They have dielectric porcelain elements 200 and 300 respectively and through holes 201 and 301 in the dielectric porcelain elements. Furthermore, they each have pair electrodes 202 and 203 or 302 and 303 formed on the end surfaces, where the through holes 202 and 203 or 302 and 303 open. The electrodes 203 and 303 are bonded by means of soldering or the like to the raised portions 101 and 102.

The conductors 4 and 5 pass through the through holes 201 and 301 respectively of the through type capacitors 20 and 30 and are connected independently to the electrodes 202 and 203. They pass through holes 103, 104 formed in the raised portions 101 and 102 of the grounding member 1 in a contact-free state and their opposite end portions are led out to the outside.

The outer insulating resin 70 and inner insulating resin 80 are formed so that they are continuous to each other at the through type capacitors 20 and 30, and their entire outer circumferences constitute space-partitioning contours. Alternatively, they may be formed so that they are independent of each other at the through type capacitors 20 and 30.

Figure 18:
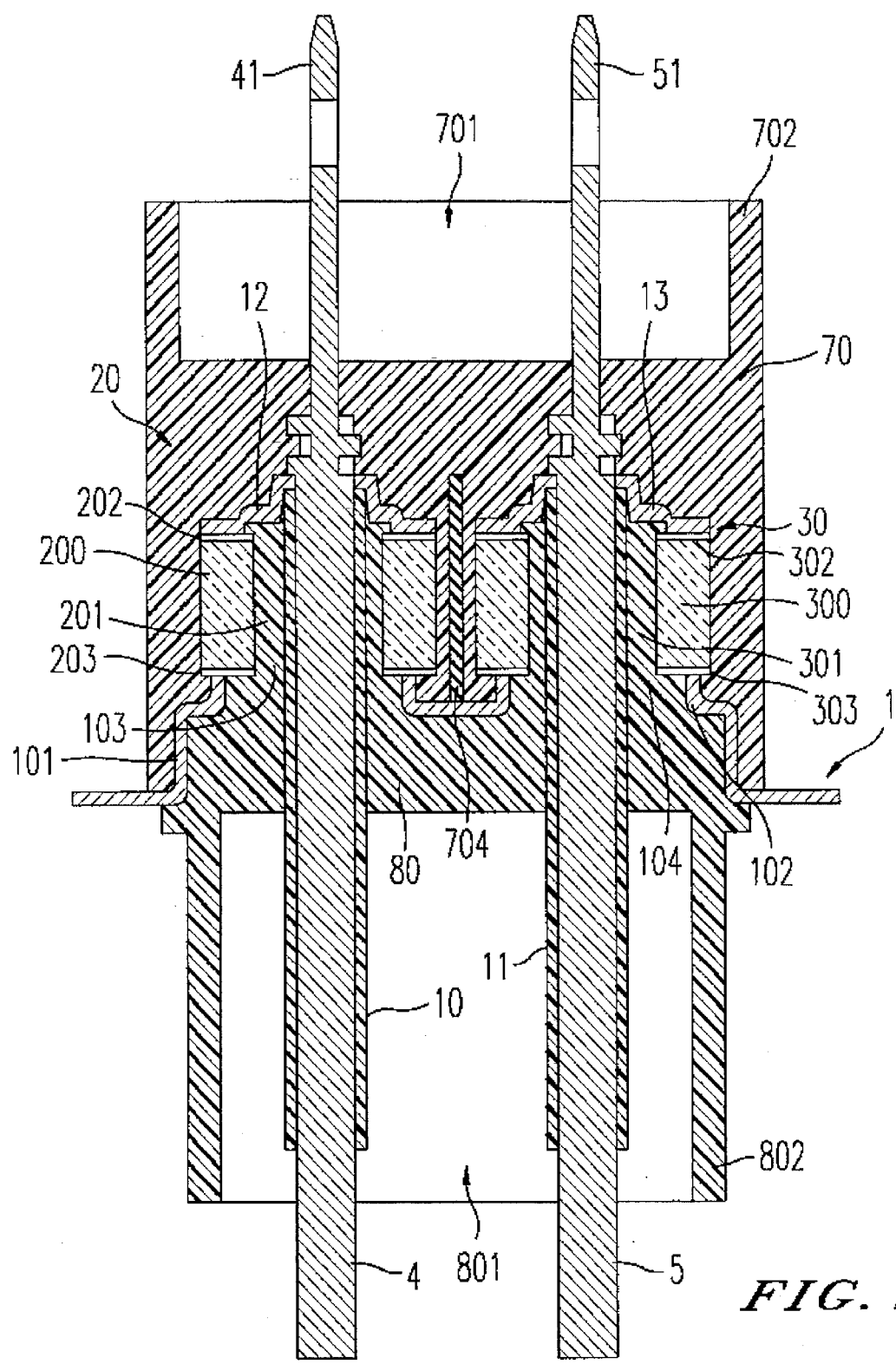
FIG. 18 is a sectional front view showing yet another embodiment of the high voltage capacitor according to the fifth aspect of the present invention.

FIG. 18 shows yet another embodiment of the high voltage capacitor according to the fifth aspect of the present invention. In this instance, an insulating partitioning member 704 is disposed in outer insulating resin 70 between through type capacitors 20 and 30. With this structure, in which the outer insulating resin 70 is divided into two parts, one on the side of the through hole capacitor 20 and the other on the side of the through type capacitor 30, mutual stress interaction can be reduced for more effectively preventing the separation, gaps or cracks from occurring in the contact interface between the through type capacitors 20 and 30 and the outer insulating resin 70.

Figure 19:
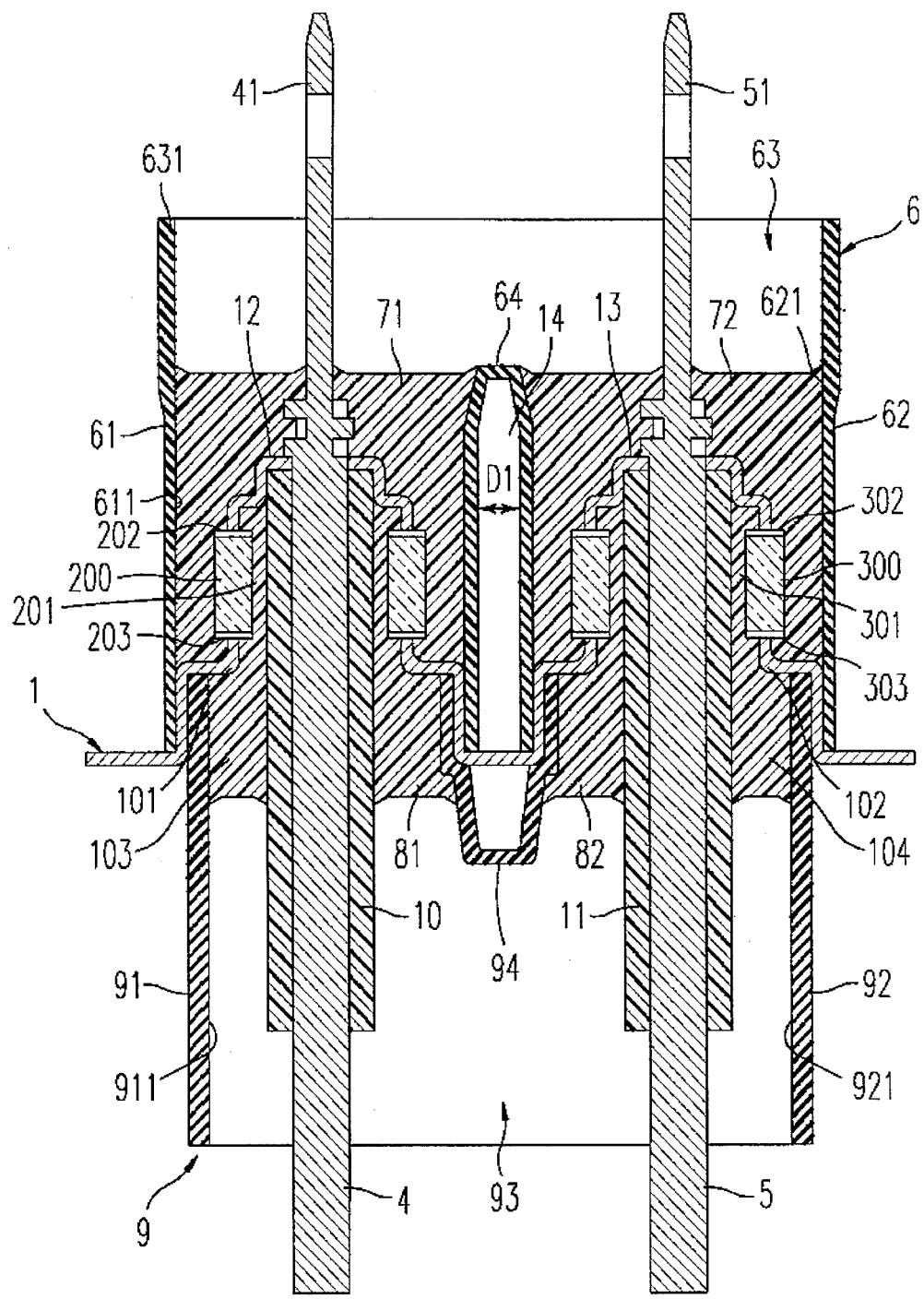
FIG. 19 is a sectional front view showing an embodiment of the high voltage capacitor according to the sixth aspect of the present invention.

Now, an embodiment of the sixth aspect of the present invention will be described with reference to FIG. 19. In the Figure, reference numerals are the same as those in the preceding Figures and designate parts that are substantially the same. This embodiment of the high voltage capacitor has basically the same structure as the high voltage capacitor shown in FIGS. 1 and 8. The insulating resins 71 and 72, 81 and 82 are formed around through type capacitors 20 and 30 so that they are in close contact with dielectric porcelain elements 200 and 300. For the insulating resins 71 and 72, 81 and 82, epoxy type or like insulating resins are mainly used. The dielectric porcelain elements 200 and 300 which constitute the through type capacitors 20 and 30 have a surface grain size of 2 to 5 µm, which is much larger than that of prior art dielectric porcelain elements.

Figure 20:
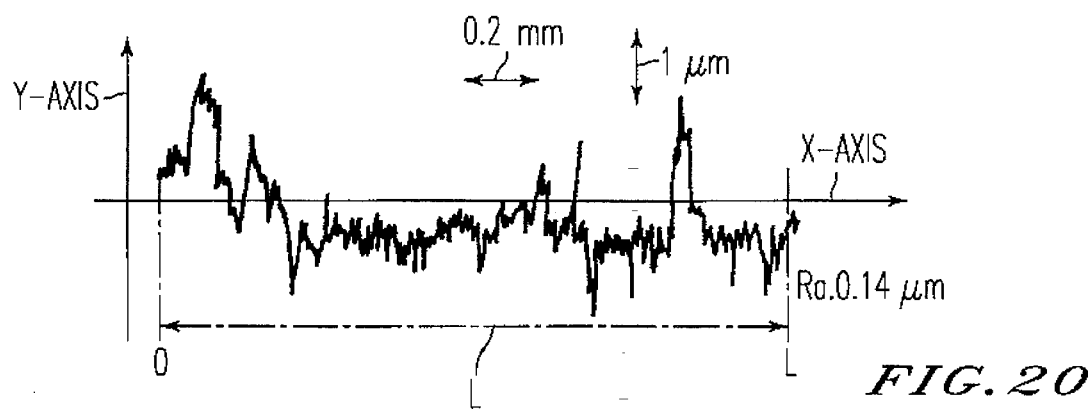
FIG. 20 is a diagram showing a surface roughness curve of the dielectric porcelain element used for a prior art high voltage capacitor.
Figure 21:
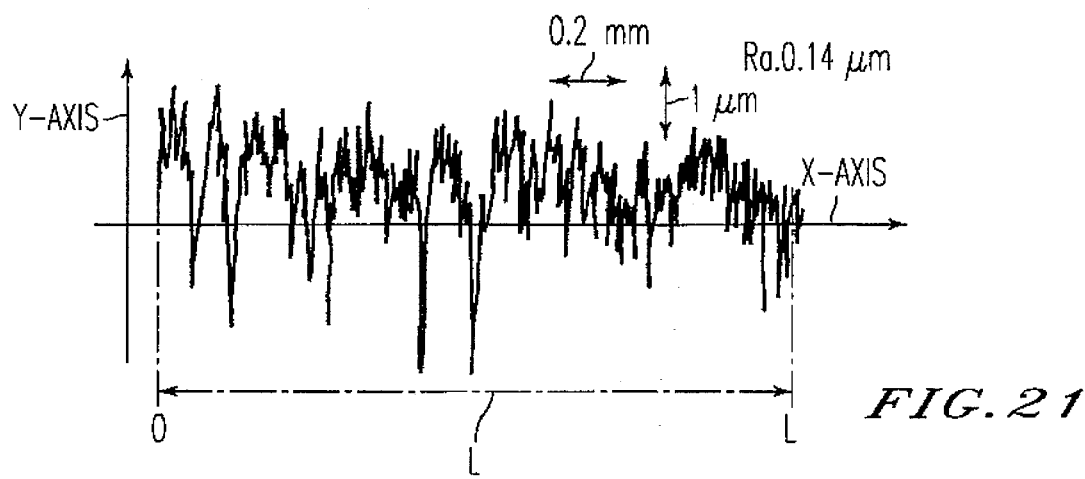
FIG. 21 is a diagram showing a surface roughness curve of the dielectric porcelain element used for an embodiment of the high voltage capacitor according to the sixth aspect of the present invention.

The dielectric porcelain elements 200 and 300 have a surface roughness of 0.2 µm or above. FIGS. 20 and 21 respectively show surface roughness curves of a dielectric porcelain element used for a prior art high voltage capacitor and that used for the sixth embodiment of the high voltage capacitor according to the sixth aspect of the present invention. In FIG. 20, representing the prior art product, the surface roughness Ra is 0.14 µm, whereas in FIG. 21, representing the present invention Ra is 0.25 µm. The surface roughness Ra is a value per unit length of the roughness curve which is expressed as $y=f(x)$ with the x-axis taken as the center line of its extracted portion having a measured length L in the direction of the center line of the curve and the y-axis being perpendicular to the x-axis. Ra is obtained by integrating $y=f(x)$ from length 0 to length L and dividing the integral by length L.

Figures 22, 23:
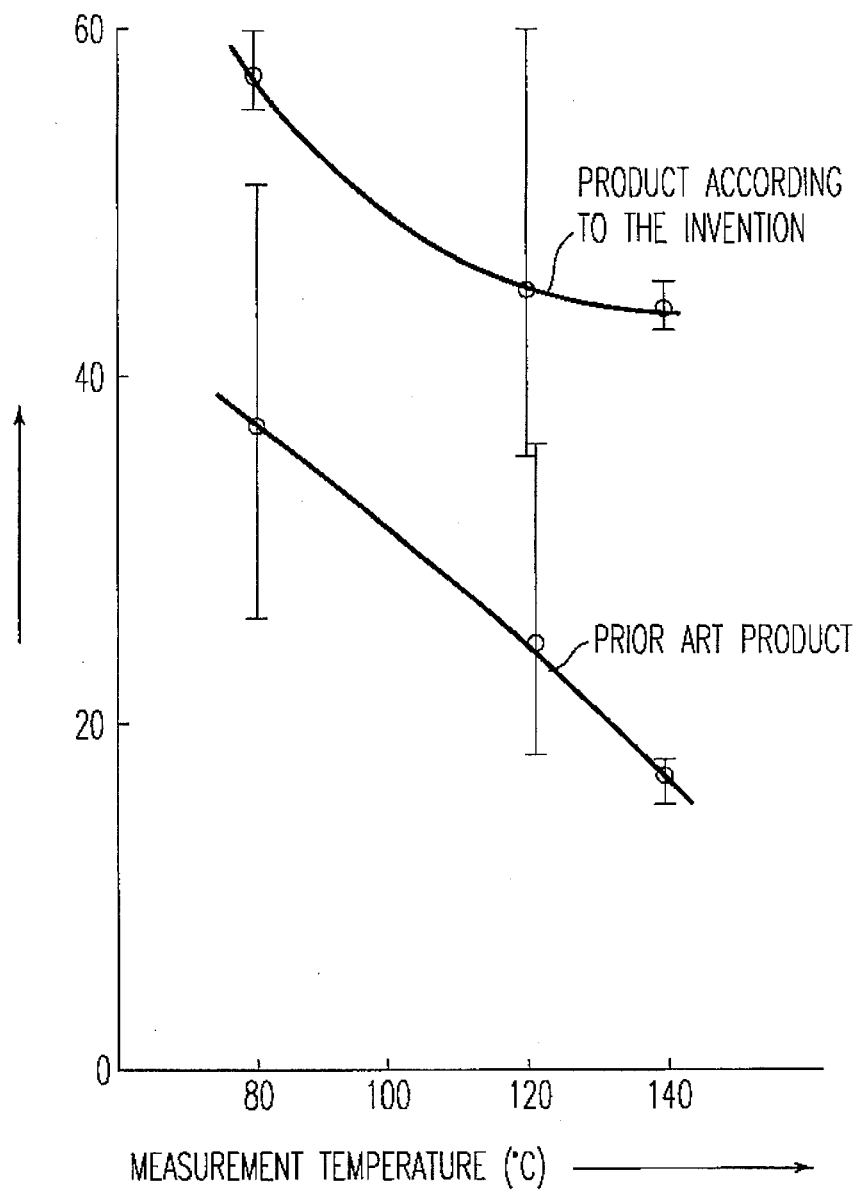
FIG. 22 is a diagram showing measured data of the bonding strength between the dielectric porcelain element and the insulating resin in an embodiment of the high voltage capacitor according to the sixth aspect of the present invention.
FIG. 23 is a diagram showing results of high temperature loading tests on a product according to the sixth aspect of the present invention product according to the invention) and a prior art product.

If the dielectric porcelain elements 200 and 300 of the through type capacitors 20 and 30 have a surface grain size of 2 to 5 µm and a surface roughness of 0.2 µm or more, the bonding force between the dielectric porcelain elements 200 and 300 and the insulating resins 71 and 72, 81 and 82 are greatly improved. FIG. 22 shows actual measured data on the bonding strength. As shown in the Figure, in a measurement temperature range of 80° to 140° C., the bonding strength, which was about 20 to 40 kgf/cm$^2$ with the prior art product, is increased up to about 40 to 60 kgf/cm$^2$. Thus, the likelihood of separation, gaps or cracks occurring in the contact interface between the dielectric porcelain element of the through type capacitor and the insulating resin due to temperature changes in heat shock tests or heat cycle tests or in use is reduced. In addition, the reliability of the high voltage capacitor in reliability tests such as high temperature loading tests or moisture resistance loading tests or in use in high temperature, high relative humidity environments is greatly improved.

FIG. 23 shows the results of high temperature loading tests. The tests were conducted by taking out a suitable number of products according to the present invention and prior art products and applying a high DC voltage of 15 kv to them under a temperature condition of 120° C. As shown in the Figure, with the prior art products, electric breakdown took place after 3, 6, 16, 22 and 500 hours had elapsed, presumably due to separation of the insulating resin. In contrast, with the products according to the present invention electric breakdown did not take place even after 2000 hours had elapsed. This is owing to a significant improvement in reliability in reliability tests such as high temperature loading tests or moisture resistance loading tests or in use under high temperature, high relative humidity conditions.

Figure 24:
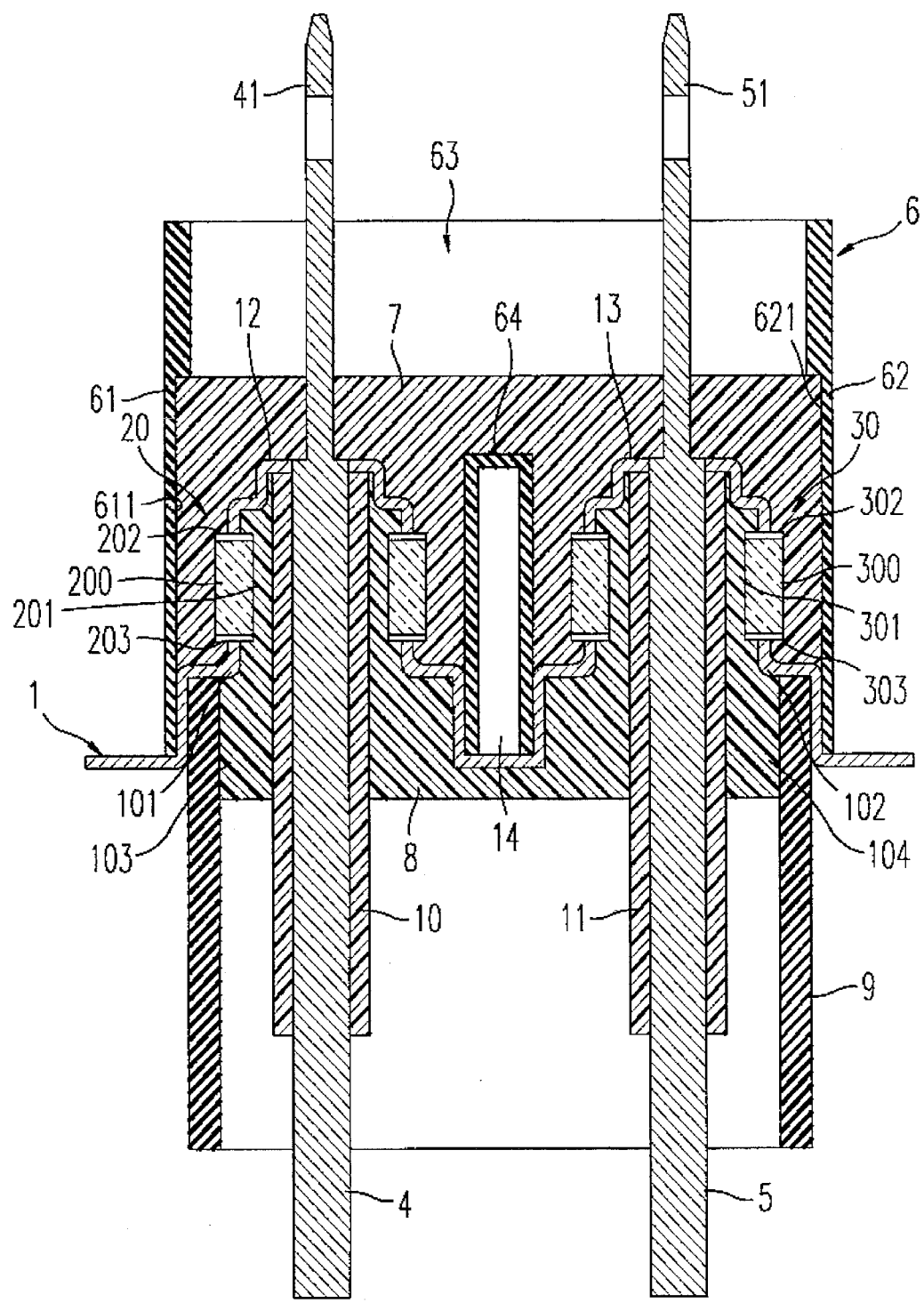
FIG. 24 is a sectional front view showing another embodiment of the high voltage capacitor according to the sixth aspect of the present invention.

FIG. 24 shows another embodiment of the high voltage capacitor according to the sixth aspect of the present invention. In the Figure, reference numerals are the same those in the preceding Figures and designate parts substantially the same. The insulating case 6 has a joining portion 64, which is embedded in the outer insulating resin 7. Although not shown, the sixth aspect of the present invention is broadly applicable to the high voltage capacitors shown in FIGS. 1 through 23.

Figure 25:
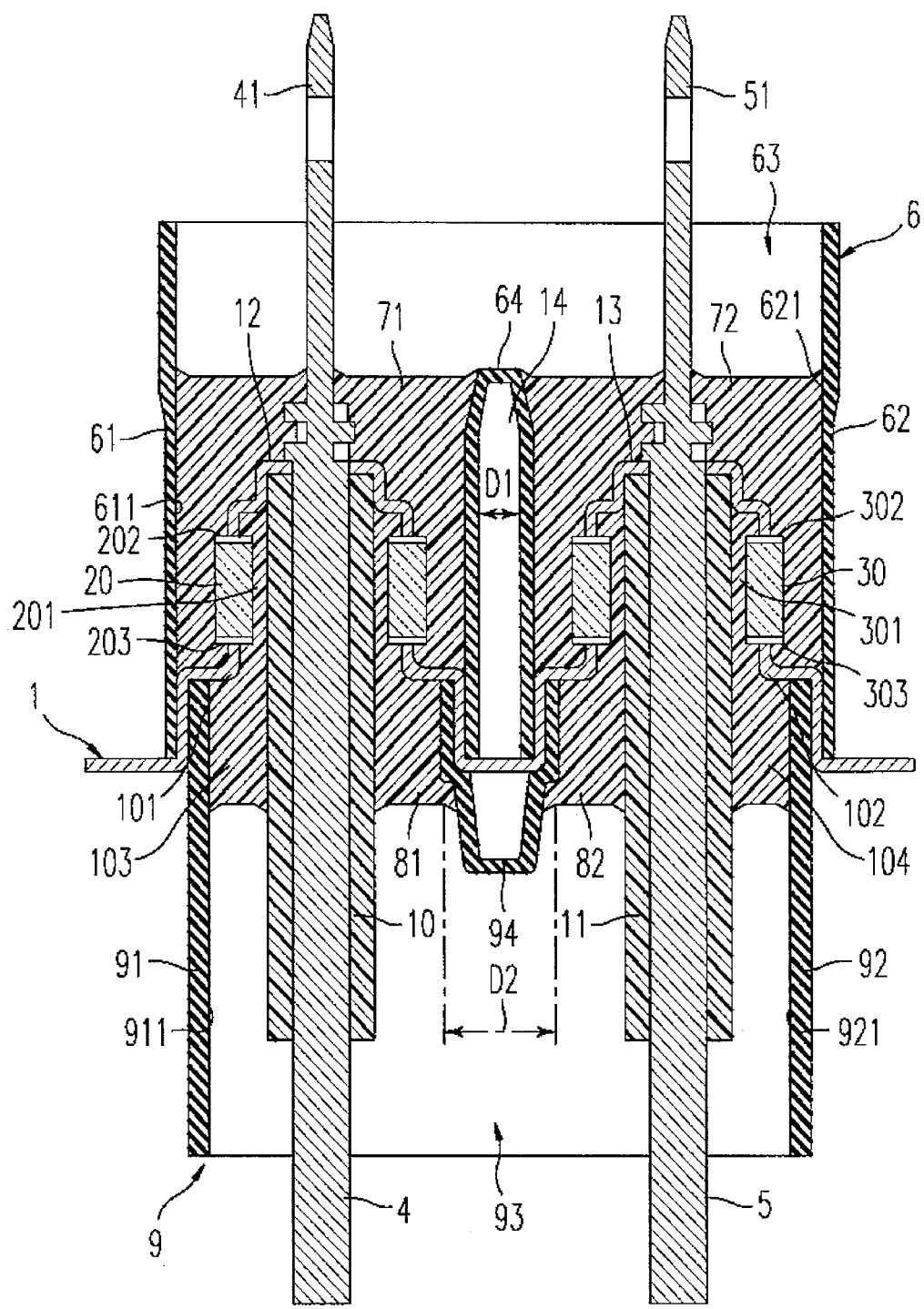
FIG. 25 is a sectional front view showing a seventh embodiment of the high voltage capacitor according to the present invention.

Now, an embodiment of the seventh aspect of the present invention will be described with reference to FIG. 25. In the Figure, reference numerals are the same as those in the preceding Figures and designate parts substantially the same. This embodiment of the high voltage capacitor has basically the same structure as the high voltage capacitors shown in FIGS. 1, 8 and 19. Referring to the Figure, at least either the outer insulating resin 71 and 72 or the inner insulating resin 81 and 82 is composed of a urethane resin. The outer insulating resin 71 and 72 is made of a thermosetting resin such as an epoxy or unsaturated polyester resin and is formed around through type capacitors 20 and 30 on one side of grounding member 1. It is in close contact with dielectric porcelain elements 200 and 300. The inner insulating resin 81 and 82 is made of a urethane resin and formed so as to fill through holes 201 and 301 of the through type capacitors 20 and 30. It is in close contact with the dielectric porcelain elements 200 and 300. The insulating tubes 10 and 11 cover the portions of conductors 4 and 5 passing through the through holes 201 and 301.

With the above structure, the elasticity of the urethane resin and the adhesion thereof with the dielectric porcelain elements 200 and 300 have an effect of reducing the likelihood of separation, gaps or cracks occurring in the contact interface between the inner insulating resin 81 and 82 and dielectric porcelain 200 and 300 due to thermal stress generated in heat cycle tests or heat shock tests or in use. Thus, the reliability in reliability tests such as high temperature loading tests or moisture resistance loading tests or in use in high temperature, high relative humidity environments is greatly improved. Furthermore, the elasticity of the insulating tubes 10 and 11 and the elasticity of the urethane resin have a combined effect of further reducing the likelihood of separation in the contact interface between the dielectric porcelain elements 200 and 300 and the inner insulating resin 81 and 82.

Although not shown, if the outer insulating resin 71 and 72 is made of a urethane resin, the elasticity of the urethane resin and the adhesion thereof to the dielectric porcelain elements 200 and 300 likewise have an effect of reducing the likelihood of separation, gaps or cracks occurring in the contact interface between the insulating resin 71 and 72 and the dielectric porcelain 200 and 300 due to thermal stress generated in heat cycle tests or heat shock tests or in use, thus greatly improving reliability in reliability tests such as high temperature loading tests, moisture resistance loading tests or in use in high temperature, high relative humidity environments.

Figure 26:
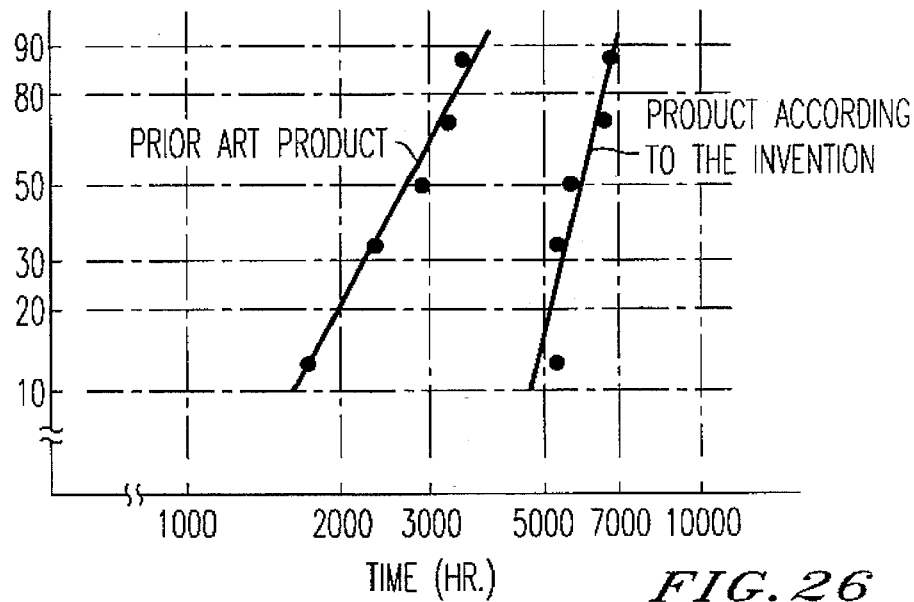
FIG. 26 is a diagram showing results of high temperature loading tests on a product according to the seventh aspect of the present invention (product according to the invention) and a prior art product.

FIG. 26 shows the results of high temperature loading tests. The tests were conducted by taking out a suitable number of samples of the product according to the present invention and those of the prior art product and applying a high DC voltage of 15 kv to them under a temperature condition of 120° C. The tested product according to the present invention was prepared by using a urethane resin for the outer and inner insulating resins 71 and 72, 81 and 82. As shown in the Figure, with the prior art product the accumulative failure factor reaches 90% after 3500 hours, whereas with the product according to the present invention it reaches 90% after 7000 hours, thus showing double the life of the prior art product.

Figure 27:
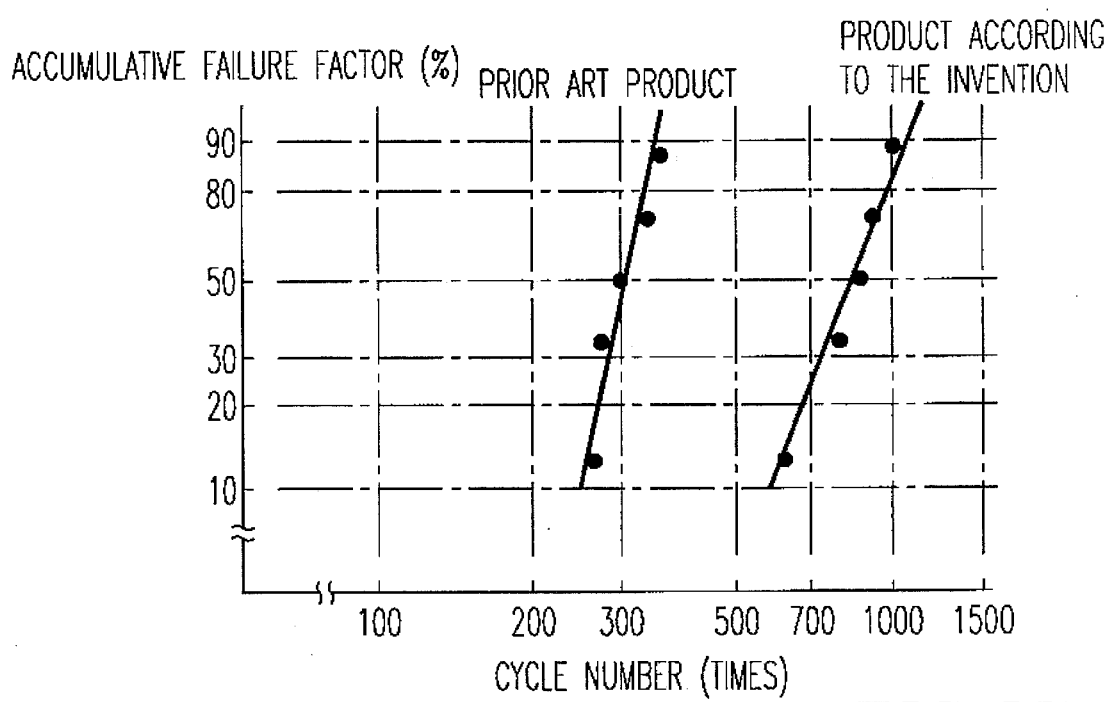
FIG. 27 is a diagram showing results of heat shock tests on a product according to the seventh aspect of the present invention (product according to the invention) and a prior art product.

FIG. 27 shows results of heat shock tests. The tests were conducted by taking out a suitable number of samples of the product according to the present invention and those of the prior art product. Each sample was given a heat shock in a cycle pattern of one hour at 120° C. and then one hour at −40° C. A voltage breakdown test was conducted for every 10 cycles, and electric breakdown, presumably due to separation was checked for. As shown in the Figure, with the prior art product the accumulative failure factor reaches 90% after 350 cycles, whereas with the product according to the present invention it reaches 90% after 1000 cycles, thus showing triple the life of the prior art product.

Figures 28, 29:
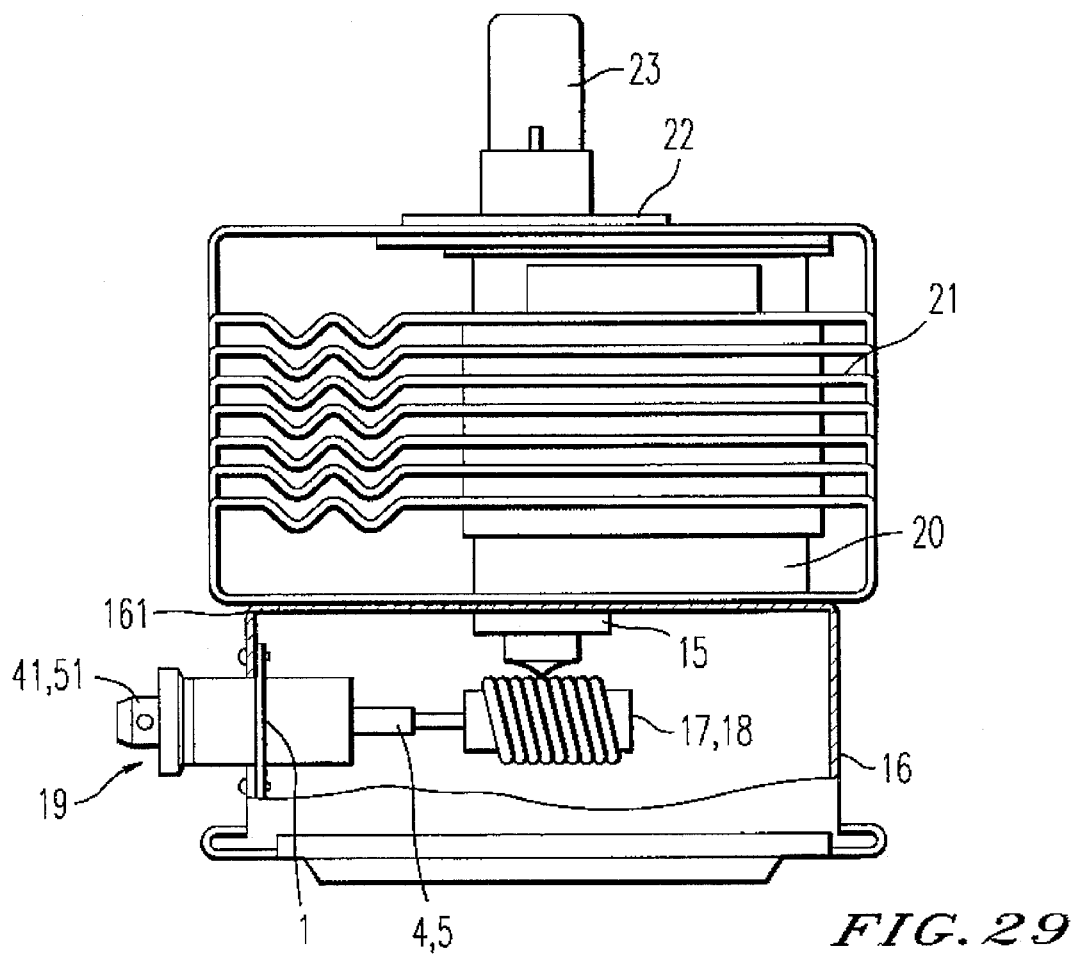
FIG. 28 is a diagram showing results of moisture resistance tests on a product according to the seventh aspect of the invention (product according to the invention) and a prior art product.
FIG. 29 is a partial break-away front view showing a magnetron incorporating the high voltage capacitor according to the present invention.

FIG. 28 shows the results of moisture resistance tests. The tests were conducted by taking out a suitable number of samples of the product according to the present invention and those of the prior art product. Each sample was left in an atmosphere at a temperature of 40° C. and under a relative humidity of 90 to 95% RH, and withstand voltage tests were conducted after 240, 500, 1000, 1500, 2000, 3000, 4000 and 5000 hours had elapsed to check for electric breakdown presumably due to separation. As shown in the Figure, with the prior art product, failure occurred after 1500 and 2000 hours, whereas with the product according to the present invention no failure was detected even after 5000 hours.

The above results verify a significant improvement in reliability in the reliability tests such as a high temperature loading tests or moisture resistance tests or in use under high temperature, high relative humidity environments.

The seventh aspect of the present invention is also broadly applicable to high voltage capacitors having various structures, for instance the high voltage capacitors shown in FIGS. 1 through 24.

FIG. 29 is a partial cut-away section of a magnetron which has the high-voltage capacitor of the present invention fitted as a filter. Reference numeral 15 indicates the cathode stem, 16 the filter box, 17 and 18 inductors and 19 the high-voltage capacitor of the present invention. The high-voltage capacitor 19 functions as a filter along with inductors 17 and 18. The filter box 16 is placed so that it covers the cathode stem 15, and the high-voltage capacitor 19 passes through the through hole created in the side plate

161 of the filter box 16 so that the outer insulating resin 70 is exposed to the outside. It is mounted and bonded on to the side plate 161 of the filter box 16 with the grounding member 1. The inductors 17 and 18 are directly connected between the cathode terminal of the cathode stem 15 and the conductors 4 and 5 of the high-voltage capacitor 19 inside the filter box 16. Reference numeral 21 indicates cooling fins, 22 a gasket, 23 the RF output terminal and 24 indicates a magnet.

INDUSTRIAL APPLICABILITY

According to the first aspect of the present invention, the following advantages can be obtained. Since the grounding member has two raised portions formed on the same side, the two through type capacitors with through holes are disposed on the raised portions and each has two electrodes formed on the opposite surfaces, where the through hole opens, one of the two electrodes is bonded to the raised portion, and the conductors passing through the through holes of the respective through type capacitors are independently connected to the other electrodes thereof. Thus, it is possible to provide a high voltage capacitor and a magnetron, which have reduced likelihood of interface separation and also reduced likelihood of the withstand voltage failure as well as being small in size and inexpensive.

In addition, since the two through type capacitors are accommodated within the inner diameter sections of the respective hollow cylindrical projections of the insulating case, and the insulating resin is provided around through type capacitors thus accommodated, it is possible to pour a minimum necessary amount of insulating resin into the individual hollow cylindrical projections and substantially independently between the same. Thus, it is possible to provide a high voltage capacitor and a magnetron, in which less thermal stress is generaed in use in a microwave oven and in heat cycle tests, and which thus has superior withstand voltage characteristics.

Furthermore, since the two hollow cylindrical projections of the insulating case are joined and have their lower open end fitted on the outer circumference of the raised portions of the grounding member, it is possible to provide a high voltage capacitor and a magnetron of high quality and high reliability, which the mechanical strength of the through type capacitors and conductors accommodated in the inner spaces of the hollow cylindrical projections is fortified thus preventing interface separation of the conductors, through type capacitors and grounding member from the insulating resin due to otherwise possible looseness of the conductors, thus greatly improving the withstand voltage characteristics.

Furthermore, since the insulating case has a recessed enclosure formed at the upper open ends of the two hollow cylindrical projections in line with and following the inner diameter sections, it is possible to provide a high voltage capacitor and a magnetron, which permits reduction in the number of insulating resin pouring steps by one half and thus permits cost reduction.

Furthermore, since the upper open ends of the two hollow cylindrical projections form a recessed enclosure in line with and following the inner diameter sections, it is possible to provide a high voltage capacitor and a magnetron with superior withstand voltage characteristics under humid conditions, and which can be used successfully in environments of high relative humidity or with much dust.

Furthermore, since the two hollow cylindrical projections of the insulating case are spaced apart, the space created between the projections constitutes a heat radiation zone, and thus it is possible to provide a high voltage capacitor and a magnetron, in which less thermal stress is generated in use in a microwave oven or in heat cycle tests, and which thus has reduced likelihood of the withstand voltage failure.

According to the second aspect of the present invention, the following advantages can be obtained. Since the insulating case is made of a thermoplastic resin, it is possible to provide a high voltage capacitor and a magnetron, which are inexpensive compared to a structure using a thermosetting resin such as an epoxy or unsaturated polyester resin.

In addition, since the insulating case is fitted on the upper end of the outer insulating resin so as to expose the outer insulating resin between its lower end and the grounding member, it is possible to provide a high voltage capacitor and a magnetron, which have a smaller insulating case and reduced material costs.

Furthermore, since the outer insulating resin is made of a thermosetting resin and the insulating case is fitted on the upper end of the outer insulating resin so as to expose the outer insulating resin between its lower end and the grounding member, it is possible to provide a high voltage capacitor and a magnetron, in which the surface of the outer insulating resin composed of a thermosetting resin having excellent tracking resistance characteristics is exposed on a path leading from the conductors along the surface of the insulating case to the grounding member, and which thus is superior in tracking resistance and humid-conditions withstand voltage characteristics.

According to the third aspect of the present invention, the outer insulating resin is made of an epoxy type resin and provided around the through hole capacitors, and the dielectric porcelain elements thereof are covered by an insulating film of an epoxy or phenol type resin. Thus, the close adhesion and bonding strength between the dielectric porcelain elements and the insulating resin are greatly increased by the insulating film covering the dielectric porcelain elements. Thus, it is possible to provide a high voltage capacitor and a magnetron in which separation and cracks in the contact interface between the dielectric porcelain element and the insulating resin can be prevented, and thus has improved reliability.

According to the fourth aspect of the present invention, the insulating resin consists of an outer insulating resin and an inner insulating resin, and at least either the outer insulating resin or the inner insulating resin is made of a urethane resin, the outer insulating resin is provided around the through type capacitors on one side of the grounding member, and the inner insulating resin is provided to fill the through holes of the through type capacitors on the other side of the grounding member. Thus, it is possible to provide a high voltage capacitor and a magnetron, which can alleviate thermal stress generated in withstand voltage tests or heat shock tests or in use owing to the elasticity of the urethane resin and the adhesion thereof with the dielectric porcelain elements.

According to the fifth aspect of the present invention, the following advantages can be obtained. Since the outer insulating resin is provided around the through type capacitor on one side of the grounding member, and its entire outer circumference constitutes a space-partitioning contour and the inner insulating resin fills the through holes of the through type capacitor on the other side of the grounding member, and its entire outer circumference constitutes a space-partitioning contour, the outer insulating resin and the inner insulating resin thus serve as outer fittings, thus permitting dispensing with the heretofore necessary insulating case and insulating cover. Thus, it is possible to provide a high voltage capacitor and a magnetron in which separation, gaps or cracks occurring in the contact interface between the dielectric porcelain element of the through type capacitor and the insulating resin due to temperature variations in heat shock tests or heat cycle tests or in use can be prevented, thus providing for improved reliability.

In addition, since neither insulating case nor insulating cover is required, it is possible to provide a high voltage capacitor and a magnetron in which various problems that have been associated with fitting such case or cover on or in the grounding member are precluded.

Furthermore, since neither insulating case nor insulating cover is required, it is possible to provide a high voltage capacitor and a magnetron with a reduced number of components and a reduced number of assembling steps, thus reducing the cost.

According to the sixth aspect of the present invention, the following advantages can be obtained. Since the dielectric porcelain elements constituting the through type capacitors have a surface grain size of 2 to 5 μm and a surface roughness of 0.2 μm or more the bonding strength between the dielectric porcelain elements and the insulating resin is increased from the prior art value of 20 to 40 kgf/cm$^2$ up to about 40 to 60 kgf/cm$^2$. Thus, it is possible to provide a high voltage capacitor and a magnetron in which separation, gaps or cracks can be prevented from occurring in the contact interface between the dielectric porcelain and the insulating resin due to temperature variations in heat shock tests or heat cycle tests or in use, thus permitting a significant improvement of its reliability in the reliability tests such as high temperature loading tests or moisture resistance loading tests or in use in high temperature, high relative humidity environments.

According to the seventh aspect of the present invention, the following advantages can be obtained. Since at least either the outer insulating resin or inner insulating resin is made of a urethane resin, it is possible to provide a high voltage capacitor and a magnetron, in which, at least on the side provided with the urethane resin, the likelihood of separation, gaps or cracks occurring in the contact interface between the dielectric porcelain of the through type capacitors and the insulating resin due to thermal stress in heat cycle tests or heat shock tests or in use can be reduced owing to the elasticity of the urethane resin and the adhesion thereof with the dielectric porcelain, thus greatly improving reliability in reliability tests such as high temperature loading tests or moisture resistance tests or in use in high temperature, high relative humidity environments.

In addition, since the insulating tubes are made of an elastic resin and cover the portions of the conductors passing through the through holes of the through type capacitors, by using a urethane resin for the inner insulating resin, it is possible to provide a high voltage capacitor and a magnetron, in which the elasticity of the insulating tubes and the elasticity of the urethane resin have a combined effect of reducing the likelihood of separation, gaps or cracks occurring in the contact interface between the dielectric porcelain elements and the inner insulating resin.

We claim:
1. A high voltage capacitor comprising:
a grounding member having at least one raised portion;
at least one through-capacitor element having electrodes on its opposite surfaces, and being disposed on said raised portion so that one of said electrodes on one side of said through-capacitor element is bonded to said at least one raised portion;
two conductors each passing through said through-capacitor element, and each being connected independently to the electrode on the other side of said through-capacitor element;
an insulating resin provided around said through-capacitor element; and
an insulating case provided on an outer surface of said insulating resin;
wherein:
said grounding member comprises two said raised portions spaced apart from each other;
two of said through-capacitor elements are provided, each being disposed on one of said two raised portions; and
said insulating case has two hollow cylindrical projections spaced apart from each other, said hollow cylindrical projections having open upper ends joined to each other to form a recessed enclosure in line with and following inner diameter sections of said hollow cylindrical projections, and having open lower ends fitted on outer circumferences of said raised portions, said through-capacitor elements being housed within said inner diameter sections.

2. A high voltage capacitor according to claim 1, wherein:
said insulating resin comprises an outer insulating resin and an inner insulating resin, said outer insulating resin made of a thermosetting resin and provided around said through-capacitor elements on one side of said grounding member, said inner insulating resin provided on the other side of said grounding member; and
said insulating case is composed of a thermoplastic resin and fitted on upper ends of said outer insulating resin so that said outer insulating resin is exposed between a lower end of said insulating case and said grounding member.

3. A high voltage capacitor according to claim 1, wherein:
said insulating resin is an epoxy resin; and
said through-capacitor elements each include a dielectric porcelain element covered by an insulating film made of an epoxy or phenol type resin.

4. A high voltage capacitor according to claim 1, wherein:
said through-capacitor elements each include a dielectric porcelain element having a surface grain size of 2 to 5 μm and a surface roughness of more than 0.2 μm.

5. A high voltage capacitor according to claim 1, comprising:
insulating tubes made of an elastic resin and fitted on said conductors passing through said through-capacitor elements; and
said insulating resin comprising an outer insulating resin and an inner insulating resin, at least one of said outer insulating resin and said inner insulating resin made of a urethane resin, said outer insulating resin provided around said through-capacitor elements on one side of said grounding member, said inner insulating resin provided to fill through holes of said through-capacitor elements on the other side of said grounding member.

6. The high voltage capacitor according to claim 1, comprising:
insulating tubes made of a silicone rubber fitted on said conductors.

7. A magnetron with a filter comprising the high voltage capacitor according to one of claims 1 to 6.

* * * * *